US012675092B2

(12) United States Patent
Shifflette

(10) Patent No.: US 12,675,092 B2
(45) Date of Patent: Jul. 7, 2026

(54) FREQUENCY DOMAIN WORK ANALYSIS OF MACHINERY INCLUDING TURBOMACHINERY

(71) Applicant: J. Michael Shifflette, Alachua, FL (US)

(72) Inventor: J. Michael Shifflette, Alachua, FL (US)

( * ) Notice: Subject to any disclaimer, the term of this patent is extended or adjusted under 35 U.S.C. 154(b) by 509 days.

(21) Appl. No.: 18/128,600

(22) Filed: Mar. 30, 2023

(65) Prior Publication Data

US 2024/0329619 A1     Oct. 3, 2024

Related U.S. Application Data

(60) Provisional application No. 63/325,614, filed on Mar. 31, 2022.

(51) Int. Cl.
G05B 19/4063     (2006.01)
G05B 19/4065     (2006.01)

(52) U.S. Cl.
CPC ................... G05B 19/4065 (2013.01); G05B 2219/50185 (2013.01)

(58) Field of Classification Search
CPC ................. G05B 19/4065; G05B 2219/50185
USPC ........................................................ 388/815
See application file for complete search history.

(56) References Cited

U.S. PATENT DOCUMENTS

| | | | |
|---|---|---|---|
| 5,720,721 A | 2/1998 | Dumas et al. | |
| 9,563,198 B2 * | 2/2017 | Anup ................. | G05B 23/0278 |
| 11,197,683 B1 | 12/2021 | Teigen et al. | |
| 11,716,880 B2 | 8/2023 | Lee | |
| 2007/0126592 A1 * | 6/2007 | Littrell ............... | G05B 23/0235 |
| | | | 700/80 |
| 2007/0196213 A1 * | 8/2007 | Parsons ................... | F04B 51/00 |
| | | | 417/42 |
| 2019/0143469 A1 * | 5/2019 | Coleman ............ | B23Q 17/0957 |
| | | | 408/1 R |
| 2021/0109158 A1 * | 4/2021 | Manson ............... | G01R 31/343 |
| 2021/0324955 A1 * | 10/2021 | Zhu ........................... | F16H 3/76 |
| 2021/0404854 A1 * | 12/2021 | Patel ................... | F04D 15/0066 |
| 2022/0025891 A1 * | 1/2022 | Abhyankar ......... | F04D 15/0066 |
| 2022/0326666 A1 * | 10/2022 | Ubert ...................... | F04B 23/02 |

* cited by examiner

*Primary Examiner* — Gabriel Agared
(74) *Attorney, Agent, or Firm* — Kaplan Breyer Schwarz, LLP

(57)     ABSTRACT

Machine performance, including efficiency, is analyzed in direct frequency domain by measuring the input power to the machine over a range of machine speeds (frequencies, ω). A differentiable mathematical function or model is identified that characterizes the input power vs. speed functional relationship. Successive derivatives of experimental power vs. speed data enable the calculation of coefficients of the mathematical function at a plurality of points (frequencies) in the frequency domain. Performance parameters including machine efficiency, pressure, pressure drag, flow, viscous drag, frictional drag, viscosity and work may be calculated from the coefficients of the mathematical function. One or more desired, optimum or best operating point(s) for machine speed may be defined in terms of the coefficients of the mathematical function or the derived performance parameters.

18 Claims, 8 Drawing Sheets

100

110

120

| ω | i (power) |
|---|---|
| 0.5 | 2.1 |
| 0.6 | 2.7 |
| 0.7 | 3.4 |
| 0.8 | 4.3 |
| 0.9 | 5.3 |
| 1 | 6.5 |
| 1.1 | 7.9 |
| 1.2 | 9.5 |
| 1.3 | 11.4 |
| 1.4 | 13.5 |
| 1.5 | 15.9 |

130

Numerically Calculated
Derivatives of Current

| i' (pressure) | i'' (flow) | i''' (6A) |
|---|---|---|
| | | |
| 6.5 | | |
| 7.8 | 14.6 | |
| 9.4 | 16.4 | 18 |
| 11.1 | 18.2 | 18 |
| 13.0 | 20 | 18 |
| 15.1 | 21.8 | 18 |
| 17.4 | 23.6 | 18 |
| 19.8 | 25.4 | |
| 22.5 | | |

140

Numerically Calculated
Polynomial Coefficients

| A | B | C | D |
|---|---|---|---|
| | | | |
| | | | |
| 3 | 1 | 2 | 0.5 |
| 3 | 1 | 2 | 0.5 |
| 3 | 1 | 2 | 0.5 |
| 3 | 1 | 2 | 0.5 |
| 3 | 1 | 2 | 0.5 |

| ω | Efficiency(η) | Total Power |
|---|---|---|
| 0.8 | 36% | 4.28 |
| 0.9 | 41% | 5.30 |
| 1 | 46% | 6.50 |
| 1.1 | 51% | 7.90 |
| 1.2 | 54% | 9.52 |

150

Motor Current (& Derivatives) vs Motor Frequency

A=3, B=1, C=2, D=0.5

FREQUENCY DOMAIN WORK ANALYSIS OF MACHINERY INCLUDING TURBOMACHINERY

STATEMENT OF RELATED CASES

This case relates to Provisional U.S. Pat. Application 63/325,614 filed Mar. 31, 2022, which is incorporated by reference herein.

FIELD OF THE INVENTION

The present invention relates to the measurement of machinery efficiency through frequency-domain analysis of motor power.

BACKGROUND INFORMATION

Electric motors are routinely used to power machinery including turbomachines such as axial, centrifugal, mixed flow or other pump designs. Pump performance may be calculated by measuring motor current, pressure and flow. Pressure and/or flow measurements are routinely incorporated in the forms of pressure gauges, pressure transducers, strain gauges, flowmeters, etc.

Machinery generally exhibits phenomena including increased wear and decreased efficiency when operated at higher speeds. Forces including friction and inertial forces are generally increased with machine speed and thus machine load and operating temperature are increased on components including bearings, gears, shafts, seals, belts, couplings, etc. Machinery is often operated at approximately constant speed which may be a compromise between the speed at which work is performed weighed against resulting machine load and heat generation. Machine efficiency may be measured through instrumentation in some cases, however the instrumentation may be complex and/or expensive.

SUMMARY OF THE INVENTION

The present invention comprises analysis of experimentally measured motor power vs motor speed data (for a variable speed machine) in terms of a mathematical model; that mathematical model may enable decomposition of motor input power into constituents including machine output work and heat. The present invention invokes the First Law of Thermodynamics, which may be stated as: the input work (e.g., to a machine) is divided into output work and heat constituents. For example, if an example motor-powered machine is tasked to raise a mass of 1 kilogram a distance of 1 meter in a gravitational field of approximately 10 m/s², then the work required to perform the task is approximately 10 Newton·meters or 10 Joules. If the input work to the machine is 10 Joules, then the machine is 100% efficient. If the input work to a similar or identical machine is 20 Joules, then that machine is 50% efficient; from the First Law, 10 Joules of energy performed the work and 10 Joules of energy were lost to heat. The rate at which work performed may be termed power, with units including Watts; machinery is frequently outfitted with power meters (or Watt meters); measuring machine output work generally not so easy as measuring input power to the machine or motor. The example machine may be operated at a plurality of machine speeds; it may be discovered experimentally that increasing the machine speed decreases the efficiency; the cause may be greater friction at higher speeds. Machines in the real world generally do not perform work tasks such as the prior example machine, which had the task of raising a mass (at any speed) through a distance in a gravitational field.

FIG. 2 is presented to provide a graphical depiction of example machines as previously described. If the first example machine were indeed 100% efficient at all speeds, then a graph of efficiency vs. speed may exhibit a slope of zero because the efficiency remains constant at 100% through all speed ranges. This theoretical machine of 100% efficiency is illustrated in FIG. 8 as perfect machine 200. However, if an example machine was 90% efficient at a machine speed of 500 RPM, 80% efficient at 700 RPM and 60% efficient at 1100 RPM, etc., then the efficiency vs. speed graph may exhibit a negative slope as illustrated in FIG. 8 as linear machine 202. The slope of as linear machine 202 may be approximately constant (or linear), and one may infer that the fraction of input work (supplied to the machine) that is lost to friction increases linearly with machine speed; the output work remains the same: 10 Joules. A linear model for frictional losses in certain machinery embodiments may be experimentally determined to be a valid model.

A second example machine, performing a different task, may exhibit a quadratic decrease in efficiency as machine speed is increased, as shown in FIG. 8 quadratic machine 204. A third example machine, performing a different task, may exhibit cubic decrease in efficiency as machine speed is increased, as shown in FIG. 8 cubic machine 206. An observed linear decrease in efficiency may be explained and experimentally confirmed by identifying friction or viscous drag as the source of heat loss. An observed quadratic decrease in efficiency may be explained by phenomena such as pressure drag, which may affect aircraft, watercraft, ground vehicles, and other high-speed machinery as fluid inertial forces manifest as pressure forces. An observed cubic decrease in efficiency may or may not have an identifiable explanation, however machine input power data exhibiting a cubic decrease in efficiency may be modeled as were the perfect, linear and quadratic observations.

The present invention comprises an apparatus or a machine which measures and/or analyzes in-situ power vs. speed relationships of machinery; the acquired and/or analyzed data may be correlated or compared to predetermined data or models (including mathematical functions or models, historical or reference data, etc.) in order to determine system parameters including efficiency, pressure, flow, drag, friction, etc. As the speed of machinery is varied, the physical loads (force, pressure, friction, drag, etc.) are also varied; any observed relationship between speed and these physical loads may be correlated to predetermined data or models including: theoretical or empirical models, historical, library or reference data, etc. In some cases, a machine may exhibit a generally linear power vs. frequency relationship; other machines may exhibit other relationships including: squared, cubed, logarithmic, exponential, sinusoidal, transcendental, etc. Embodiments of the present invention comprise decomposition of observed power vs. frequency datasets into a summation of discrete load constituents which may transform input work into either work or heat (from the First Law of Thermodynamics). The First Law provides that the sum of output work and heat is equal to the input work; the first law does not provide any means to determine the proportions of output work and heat. Embodiments of the present invention comprise a method of operating machinery at varying speeds and subsequently characterizing the machine's performance at the task of converting input work into output work. Efficiency may be defined as the portion of input work that is converted into output work (instead of heat).

An electric motor may be configured to perform five example tasks in any environment including ideal and frictionless; examples include: (1) rotating a flywheel at a constant speed, (2) elevating a mass at constant speed, (3) accelerating a mass (4) propelling a vehicle through atmosphere, or (5) driving a dynamic pump, such as a centrifugal pump. Measurement of parameters including motor speed, torque and/or electric consumption provide that power consumption (including machinery shaft input power) may be measured, calculated or inferred. The input shaft of machinery may convert rotary motion to linear motion (e.g., rack and pinion, automobile, boat, train, etc.).

Herein the terms speed and frequency ($\omega$) may be construed to mean any or all of: linear speed (mph, ft/s, m/s, etc.), angular velocity (rad/s, RPM, Hz, etc.); the terms "speed", "motor speed,", "shaft speed", "pump speed" or "machine speed" may be used in context for clarity. The terms "pump power", "pumping power" or "output power" may be used in context to quantify the rate at which work is done by a machine or pump; "input power", "motor power" or "power" may be used in context to quantify the rate at which energy is supplied to a prime mover (e.g, electric motor, IC engine, turbine, etc., typical units include: watts [w], current [i], horsepower [HP], etc.). Herein, "work" has definitions consistent with classical mechanics (e.g., $W=Fd$, $W=T\theta$, etc. where W is work, F is force, d is distance, T is torque and $\theta$ is angular displacement). The rate at which work is performed is power; output power may be experimentally determined by instrumentation (or combinations thereof) such as: dynamometers, flow meters, pressure gauges/transducers, timers, etc. Herein, frequency may be normalized and/or non-dimensionalized by dividing by a reference frequency, such as $\omega_0$; this may result in a domain which on the order of 1 and frequency may be dimensionless. For example, an experimental frequency of $\omega=5,100$ Hz may be normalized by dividing by a reference frequency of $\omega_0=5,000$ Hz to obtain a normalized experimental frequency of $(5,100/5,000=1.02)$; thus the experimental frequency may be reported and mathematically manipulated as $\omega=1.02$, with no units or dimensions.

The present invention analyzes the relationship between power supplied to a prime mover (input power) and the rate of work done (output power) by a machine (e.g., pump, milling machine, ground vehicle, generator, etc.) as a function of frequency. Embodiments of the present invention utilize a predetermined mathematical function (or model) which provides a functional relationship between input power and output power. In accordance with embodiments of the present invention, the shaft speed of a motor (e.g., electric, internal combustion, etc.) may be varied to a plurality of shaft speeds such that input power data may be collected as a function of machine speed. In the five example tasks of an electric motor, steady-state conditions are generally analyzed after transient responses have decayed. Thereby, an array of steady-state motor power (e.g., electric current, fuel consumption rate, etc.) vs. frequency data may be collected in accordance with the methods comprising the present invention.

The power required to perform a first example task (rotating a flywheel at constant speed) is theoretically independent of shaft speed (no work is required to maintain the speed of a frictionless flywheel, e.g., gyroscope, etc.). Experimentally, friction and motor losses in this system may exhibit a functional dependency (e.g., linear) upon shaft speed. Thus, the experimental power measurements conducted upon the first example task (rotating a flywheel) may exhibit a linear relationship of power with shaft speed, in accordance with appropriate models characteristic for a motor, viscous drag and/or dynamic friction.

The power required to perform a second example task (elevating a mass at constant speed through a gravitational potential) may be modeled as linearly proportional to the shaft speed (power=work/time). This model predicts that a 100% efficient, frictionless machine will require two times the power to elevate a mass at two times the speed. This may be rationalized by the statement: 100% of the work is performed in 50% of the time at 200% of the power; the input and output work remains the same, only the power and duration have changed. Viscous drag, along with many other frictional sources, may also exhibit losses/inefficiencies which are linearly proportional to shaft speed. Observation of a linear frequency-power relationship (wherein power is proportional to $C\omega$, where is C is an arbitrary constant) may infer that the load on the motor may be comprised of some combination of output work (lifting a mass, creating a flow, etc.) as well as frictional losses (dynamic friction, viscous drag, etc.).

The power required to perform a third example task (accelerating a mass at a constant gravitational potential, e.g., accelerating a ground vehicle) may be modeled as linearly proportional to the rate of acceleration, from Newton's Second Law. This acceleration may be provided by an acceleration of the motor, or a variable-ratio gearbox or mechanism may accelerate the mass at constant motor speed. Analysis of accelerating systems is considered subsequently.

The power required to perform a fourth example task (propelling a vehicle through atmosphere) may be modeled as a speed-squared relationship at highway speeds (pressure drag, derived from Bernoulli's Equation, the inviscid momentum equation). This speed-squared model for pressure drag predicts that doubling a vehicle's speed will require four times the power lost to pressure drag. Observation of a frequency-squared relationship (power is proportional to $B\omega^2$, where B is an arbitrary constant) may infer that the load on the motor may be comprised of pressure-drag losses or other form of loss (or output work) that is characteristic to the system.

The power required for a fifth example task (driving a centrifugal pump) may be modeled as a frequency-cubed relationship (from the affinity laws of centrifugal pumps). This speed-cubed model for pumping power (power is proportional to $A\omega^3$, where A is an arbitrary constant) predicts that doubling a pump shaft speed will require 8 times the power. Observation of a frequency-cubed relationship may infer that a machine, such as a turbomachine, is converting shaft input work into output work, such as pumping work.

Examples of variable-speed machinery each generally exhibit a characteristic relationship between input speed and power consumption. As an example, a milling machine operation performs an amount of work (material removal) in an amount of time; the spindle (cutter) speed and the x-, y-, and z-axis feed speeds may be independently adjusted. In this case, operating the spindle of the milling machine at a speed greater than optimum does not produce an increase in the work performed (material removal), yet more energy is consumed to do the very same amount of work. Optimizing the (x-, y-, z-axis) rates of feed of a milling machine may be conducted similarly such that both spindle speed and feed rates may be simultaneously optimized as a coupled system. The milling machine example is provided in light of published equations (e.g., Sandvik Coromant, etc.) which relate milling machine power to spindle speed and feed rate(s). CAD/CAM software may also utilize library, empirical data and/or a mathematical model to predict an optimized estimate for speed and feed rates. The mathematical models are likely empirical because theoretical modeling of a milling operation is dependent upon a large number of factors, including cutter condition, material composition, hardness, temper, temperature, fixture rigidity, etc. Thus CAD/CAM software may provide speed and feed rates suggested from available engineering data. The present invention comprises the methodology to analyze in-situ power measurements (from operating machinery) for optimum feed and speed settings; thus a milling machine comprising embodiments of the present invention may make speed and feed adjustments to compensate for parameters including: cutter sharpness, temperature, lubrication, cooling, vibration, etc.

Some examples of variable-speed machinery perform work at a rate that may be mathematically modeled from governing equations such as the Newton's Second Law, or the continuity and/or momentum equations from fluid mechanics. These equations may also relate a shaft speed to the rate at which work is performed. Herein, mathematical relationships between shaft speed and the rate at which useful work is performed may be termed: governing, empirical, affinity, experimental, database, library, etc. Examples relevant to the present invention include the affinity laws for a centrifugal pump; these equations are derived from governing equations of fluid mechanics.

This disclosure of the present invention defines machine efficiency to be inclusive of (output work/input work, or output power/input power) and presents examples of known relationships between input shaft speed vs. flow, pressure and power for example machinery. In other cases, no foreknowledge of these relationships may be available. The present invention is well suited to optimizing the efficiency of machinery with or without a governing equation or mathematical model identified beforehand.

Eq. 1, eq. 2 and eq. 3 are the affinity laws for a centrifugal pump, $$\text{Flow: } \frac{q_1}{q_2} = \frac{\omega_1}{\omega_2} = k\omega_1 \qquad \text{Eq. 1}$$

$$\text{Pressure: } \frac{p_1}{p_2} = \left(\frac{\omega_1}{\omega_2}\right)^2 = \frac{\omega_1^2}{\omega_2^2} = (k\omega_1)^2 \qquad \text{Eq. 2}$$

$$\text{Power: } \frac{i_1}{i_2} = \left(\frac{\omega_1}{\omega_2}\right)^3 = \frac{\omega_1^3}{\omega_2^3} = (k\omega_1)^3 \qquad \text{Eq. 3}$$

where $\omega$ is the shaft speed (e.g., RPM, rad/s, Hz, etc.), q is the flow rate (e.g., $m^3$/s, GPM, etc.), p is the pressure (e.g., Pa, psi, inHg, feet of water, etc.), i is the motor current, as a measure of power (in units including amps and/or watts) and k is the ratio of the shaft speeds. Thus flow, pressure and motor current/power are functions of the motor speed, $\omega$. Note that eq. 3 is the product of eq. 1 and eq. 2; this is in agreement with the relationship that power is equal to the product of pressure and flow for a pump.

Taking a first derivative of eq. 1, eq. 2 and eq. 3 yields eq. 4, eq. 5, and eq. 6:

$$\text{Flow: } \frac{dq}{d\omega} = k \qquad \text{Eq. 4}$$

6

-continued $$\text{Pressure: } \frac{dp}{d\omega} = 2k^2\omega \qquad \text{Eq. 5}$$

$$\text{Power: } \frac{di}{d\omega} = 3k^3\omega^2 \qquad \text{Eq. 6}$$

Per the affinity laws, as $\omega$ is varied about a range, the flow is linearly proportional to w; the slope the flow line is given to be k. As $\omega$ is varied about a range, the pressure increases in proportion to the value of $\omega^2$; the slope of the pressure line is given to be $2k^2\omega$. As $\omega$ is varied about a range, the current/power increases in proportion to the value of $k^3\omega^3$; the slope of the power line is given to be $3k^2\omega^2$. These relationships may be valid under ideal, frictionless and lossless system conditions, such that the motor, pump and coupling efficiencies are 100%.

A mathematical model relating the power, pressure and flow as functions of shaft speed, $\omega$ is provided for a centrifugal pump by the affinity laws. An electric motor and optional couplings, transmissions, belts, cables, gear reducers, etc. provide the shaft power required to physically turn the pump shaft. Pressure and flow measurement data are routinely collected and monitored by means including pressure transducers and/or flowmeters to correlate to reference pump curve data, which is typically in the form of charts, graphs, tables, spreadsheets, databases, etc. A machinery fault may be detected when the measured pressure or flow deviate from or exceed the range of expected or predetermined values. Wear or flowfield anomalies may be detected as the pressure and flow data deviate or trend from the nominal values from reference or historical data.

Embodiments of the present invention may permit the user to minimize or eliminate the need for pressure and flow measurement instrumentation by analysis of motor current data in frequency domain. Direct frequency domain analysis comprises varying the frequency (shaft speed) of a motor (and pump), and calculating the differential relationship between frequency and current within a range; of noteworthy importance is the curvature of this relationship. As the motor shaft speed increases and/or decreases, so too does the speed of the input shaft the pump. Pump curves are available which relate head, flow, power and efficiency; these pump curves may incorporate an additional independent variable: shaft speed. Aspects of the present invention comprise differential analysis (e.g., numerically calculating one or more derivatives, or slopes) of measured motor current with respect to changing the speed or frequency of the motor. The present invention comprises methods which vary the frequency (the independent variable, or domain) while measuring an output value, such as motor current or power (as the dependent variable, or range); subsequent analyses determine parameters including polynomial coefficients, slopes, curvatures, etc. at a plurality of frequencies.

Eq. 4, eq. 5 and eq. 6 are differential equations in frequency domain; frequency is the independent variable and flow, pressure and power are among the dependent variables. Embodiments of the present invention comprise varying the frequency of an electric motor powering a pump and measuring the current at a plurality of frequencies. For example, the frequency may be varied about a nominal 1000 RPM by increments of 10 RPM. In this example, the motor may be operated at 990 RPM and 1010 RPM. Two values of motor current, or power, are measured; the difference between the two motor current values is a first order approximation of the slope of the power curve at 1000 RPM (when divided by the interval of 20 RPM). Eq. 7 is a first order approximation of slope at a point, where $O(\Delta\omega)^2$ is the order (O) of error, $\Delta\omega$ is the (domain) interval between measurements; 10 in the example case.

$$i' = \frac{di}{d\omega} \approx \left( \frac{i_{1010} - i_{990}}{1010 - 990} \right) + O(\Delta\omega)^2 \qquad \text{Eq. 7}$$

This may be expanded to include 5 such current measurements such as: 980, 990, 1000, 1010, 1020 RPM. By evaluating the slope, $di/d\omega$, at several frequencies, the process of taking the first derivative by first-order finite difference may be repeated to obtain higher order derivatives including:

$$\frac{d^2 i}{d\omega^2}, \frac{d^3 i}{d\omega^3},$$

etc. Other finite difference schemes such as presented in eq. 8 may also be employed.

$$i'' = \frac{d^2 i}{d\omega^2} \approx \left( \frac{i_{1010} - 2i_{1000} + i_{990}}{10^2} \right) + O(\Delta\omega)^2 \qquad \text{Eq. 8}$$

Under the assumption that 100% of motor current is converted to shaft power and 100% of shaft power is converted to pressure/momentum/fluid energy, eq. 1 through eq. 6 may be used to "predict" the effect of changing the shaft speed, w. Thus the pressure and flow (ratios) may be calculated or inferred from the slope of the power vs frequency curve for a 100% efficient motor, coupling and pump. Real pump systems will exhibit less than 100% efficiency because of factors including: $i^2 r$ motor losses, dynamic friction, viscous drag, pressure drag, etc. Bearings and seals in the motor and pump may be sources of losses; any mechanical component intermediate between the motor and pump may also be sources of frictional losses. These frictional losses may be constant, linear, exponential, logarithmic, power or any other generally-increasing function with respect to frequency. Each source of loss (e.g., $i^2 R$ motor losses, viscous drag, dynamic friction, etc.) decreases the machine efficiency (from the First Law) because input work is converted (by these means) into heat and not into output work.

The First Law asserts that the input motor power (i, E or energy per unit time), is converted into a sum of heat (q, frictional and other losses) and work (e.g., w=pv work, pumping power, raising a mass through a gravitational field, accelerating a mass, etc.). The affinity laws of pumping power assert that power increases with $\omega^3$; therefore any pump power consumption which deviates from an $\omega^3$ characteristic may be inferred to be some sort of loss which may include: friction drag, viscous drag, pressure drag, etc. The present invention comprises analysis of motor power data to determine the proportion (of that power) which is mathematically consistent with an idealized turbomachinery pump; the remaining power may be considered attributable to losses which may include frictional, viscous, heat. etc.

For any system using an electric motor, a mathematical model of the motor current may take the generalized form of eq. 9:

$$i = A\omega^3 + B\omega^2 + C\omega + D \qquad \text{Eq. 9}$$

which provides a $3^{rd}$ order polynomial model for the power/current required for pumping as well as friction or other losses. Taking the first, second and third derivatives of eq. 9 yields eq. 10, eq. 11, and eq. 12:

$$\text{First Derivative: } i' = \frac{di}{d\omega} = 3A\omega^2 + 2B\omega + C \qquad \text{Eq. 10}$$

$$\text{Second Derivative: } i'' = \frac{d^2 i}{d\omega^2} = 6A\omega + 2B \qquad \text{Eq. 11}$$

$$\text{Third Derivative: } i''' = \frac{d^3 i}{d\omega^3} = 6A \qquad \text{Eq. 12}$$

This provides 4 equations in 4 unknowns, for which a unique solution may exist. This system of equations may be solved by back-substitution or Gauss elimination, for example. Back-substitution provides eq. 13 through eq. 16:

$$A = i'''/6 \qquad \text{Eq. 13}$$

$$B = (i'' - 6A\omega)/2 \qquad \text{Eq. 14}$$

$$C = i' - 3A\omega^2 - 2B\omega \qquad \text{Eq. 15}$$

$$D = i - A\omega^3 - B\omega^2 - C\omega \qquad \text{Eq. 16}$$

Eq. 9 presents a generalized polynomial function to model the current with respect to frequency. Eq. 3 provides that pumping power varies with $\omega^3$ for an ideal centrifugal pump; a reasonable hypothesis is that the constant A may represent the portion of motor current which is converted into pumping power. For a centrifugal pump, operating in accordance with the affinity laws, constants B, C and D may then be inferred represent inefficiencies and losses of any characteristic nature.

In an optimal pumping system, frictional losses are small enough to be neglected; however certain pumps, motors, drives, couplings, transmissions, belts or cables may exhibit appreciable friction or other losses by the nature of the design and application. Two methods of measuring friction in a pumping system are disclosed herein: (1) "dead head" the pump (close one or more valves to block the pump inlet or outlet), or (2) remove the impeller from the pump. The dead head method may incorporate fluid flow phenomena including pressure drag and viscous frictional losses (at or near the spinning impeller) while removing the impeller may effectively eliminate those fluid-flow related losses. The purpose of operating the pump system in dead head or no-impeller condition is to characterize the pressure drag, viscous drag, friction and other losses in the absence of pumping power.

Friction may be anticipated to be a linear function of frequency, whereas eq. 6 asserts that pumping power is a function of frequency cubed. An embodiment of the present invention may comprise a decomposition of the motor input power vs. speed functional relationship into a linear combination of functions including: (1) constant, (2) linear, (3) squared and (4) cubic functions of frequency, such that onset of or changes to identifiable losses (e.g., friction, pressure drag, viscous drag, etc.) and/or pumping power may be detected and discriminated. An aspect of the present invention is the ability to monitor a pump system performance without the need for pressure transducers or flowmeters, but rather by analyzing the motor current by means of direct frequency-domain analysis. The present invention comprises taking one or more derivatives of the dependent variable (i, p, q) with respect to the independent variable ($\omega$) to subsequently determine system parameters (e.g., pumping efficiency, pressure, flow, etc.). Pressure transducers and/or flowmeters are often incorporated into pumping systems; this may provide additional data (p and q) which may be similarly analyzed in frequency domain for data which may be supplemental, ancillary or confirmatory to the analysis of motor current data. Representative embodiments of frequency domain analysis of pressure and flow data are not included in this disclosure; however such analysis may be incorporated if such system data are available.

In some embodiments of the present invention, motor current is analyzed in direct frequency domain by determining numerically calculated derivatives that provide a simultaneous solution of eq. 13 through eq. 16 such that the polynomial coefficients A, B, C and D of eq. 9 may be calculated at each discrete frequency, $\omega$. Experimentally determining coefficient A (the $\omega^3$ coefficient or pumping power coefficient) enables this embodiment to measure the change in pumping power of the pump system with respect to frequency. Determining coefficient B (the $\omega^2$ coefficient or pressure coefficient) may enable measurement of the change in pressure or pressure drag; pressure drag may exhibit a $v^2$ or $\omega^2$ relationship. Determining coefficient C (the $\omega$ coefficient or flow, viscous drag or dynamic friction coefficient) may enable measurement of the change in flow. Friction of motor bearings/seals/couplings/packing glands, etc. may also increase coefficient C above the nominal viscous flow losses. Determining coefficient D provides the portion of electric power which is dissipated independent of motor frequency. Numerically calculated derivatives of experimentally collected motor current data provide a solution for the 4 coefficients for a 3rd order polynomial (cubic) equation. The ratios of pumping power (a function of $\omega^3$) may be discriminated from pressure or pressure drag (a function of $\omega^2$) which may be discriminated from flow and dynamic or viscous friction (a linear function of w) which may be discriminated from constant power loss independent of w.

The present invention permits in-situ measurement of pump performance factors which may reflect wear, friction, damaged components, and/or flow anomalies including: obstruction, occlusion, restriction, etc. The present invention is applicable to any pumping system to provide continuous or intermittent monitoring of system performance characteristics. Characteristic failure modes may be detected including: broken components, impending motor or bearing failures, clogged/occluded fluid conduit, high visocisity, excessive friction, etc.

The present invention comprises identifying a mathematical model (e.g., third order polynomial) of motor current as representative of the affinity laws (for a pump) and friction/viscous models as examples. The linear set of equations, eq. 9 through eq. 12, is shown to be solved for the polynomial coefficients A, B, C, and D (eq. 13 through eq. 16). Experimental motor current data are analyzed (including curve-fitting to a $3^{rd}$ order polynomial) to determine an array of polynomial coefficients which may decompose the data into quantifiable subsets including pumping power, friction, heat, viscous losses, motor $i^2R$ losses, etc. Decomposition of experimental motor current data into pumping power/work or other output work as distinct from inefficiencies is an aspect of the present invention. Subsequently, the experimental data may be numerically sorted into attribute data by algebraic means and compared to predetermined ranges, limits and/or thresholds or any coefficient may be ratiometrically compared to any other coefficient. Prior art provides that (fixed-frequency) experimental pump data (pressure, flow, motor current, etc.) may be correlated to database, library or reference data to qualitatively infer pump performance and flow characteristics, which may include historical trend analysis. The present invention provides that pump performance may be quantitatively determined by numerical differentiation of experimental (motor current, pressure, flow, etc.) in the frequency domain. The numerically differentiated data (e.g., motor current, pressure, flow, etc.) may be used to quantitatively measure and decompose pump system performance into pumping power and losses. Pumping efficiency may be calculated by dividing the measured pumping power divided by the total input power (e.g., motor current, motor power, etc.).

Eq. 1 through eq. 6 also support that direct frequency-domain viscometry may also be accomplished by the present invention. Eq. 1 provides that the flow ratio is equal to the frequency ratio (e.g., for an incremental change in frequency) and eq. 2 provides that the pressure ratio is equal to that frequency ratio squared. A pressure measurement means, such as a pressure transducer, provides another dependent variable (pressure) to the direct frequency domain analysis of motor current. The experimental pressure ratio (corresponding to an incremental change in frequency) may be analyzed by numerical differentiation to provide supplementary data to be correlated to the power ratio, both as functions of motor frequency. The affinity laws (Eq. 1 through Eq. 3) provide a mathematical model for a 100% efficient centrifugal pump which pumps in inviscid fluid; any finite fluid viscosity may provide viscous friction, this viscous friction may be generally linear with frequency. Any pump system which (perhaps historically) exhibits known losses (e.g., generally linear losses including bearing/seal, $i^2$ motor, dynamic friction, etc.) and which exhibits an increase in those losses may infer an increase in fluid viscosity; this increase in viscosity may be quantified by the methods of the present invention and co-pending provisional US patent applications by the same inventor. For instance, a 30% increase in the linear frequency coefficient, C, may be correlated to data (e.g., experimental, theoretical, calibration, etc.) to determine a corresponding increase in viscosity, e.g., 60% increase in viscosity corresponds to a 30% increase in coefficient C (as may be determined by experimentation, calibration constants or analytical means, etc.).

Eq. 1 through 3 assert that motor current varies with $\omega^3$, pressure varies with $\omega^2$ and flow varies directly with $\omega$ for a centrifugal pump. In practice, motor current is commonly and inexpensively measured; pressure may be measured via pressure transducers at minimal expense and difficulty whereas flow measurement typically requires more elaborate, expensive and complicated means. Any or all of these data (i, p and q) may be analyzed in direct frequency domain; analysis of optional pressure and flow data provide further embodiments of the present invention. The installation and maintenance costs (of such instrumentation) may or may not be justified by the requirements of the pumping system application. In the examples and embodiments presented herein, motor current is analyzed. Pressure and flow may be similarly analyzed; this disclosure primarily provides analysis of motor current; however pressure, flow and any other relevant measureable parameter or variable is anticipated as a constituent of the present invention.

The foregoing analyses employed the affinity laws of centrifugal pumps to "decompose" relationship between shaft speed and: (1) friction, (2) flow, (3) pressure and (4) pumping power such that the efficiency may be calculated from motor current vs. speed data. The affinity laws lend to a 3rd order polynomial model which is amenable to numerical analysis to find (successive) derivatives at a point in the frequency domain. The affinity laws suggested that a 3rd order polynomial is an appropriate mathematical model for a centrifugal pump. However, the present invention is well suited for application to mechanical systems with no such known or identifiable governing equation. In the absence of any such governing equation, a database or library of empirical model or experimental data may be constructed whereby the shaft speed is varied and any performance parameter (pressure, flow, material removal rate, temperature, etc.) may be measured and recorded. These data may comprise motor speed vs. power data in matrix form which include measured, derived or inferred parameters including pressure, flow, force, material removal rate, temperature, etc.

Turbomachinery, such as a centrifugal pump, represents an ideal candidate for direct frequency-domain analysis; embodiments selected for inclusion and analysis in this disclosure are generally limited to pumps and pump systems. The present invention is applicable to a range of machinery, including, but not limited to: ground vehicles and watercraft, milling machines and lathes, hydraulic equipment, hoists and winches, etc.

DETAILED DESCRIPTION OF THE DRAWINGS

Figure 1:
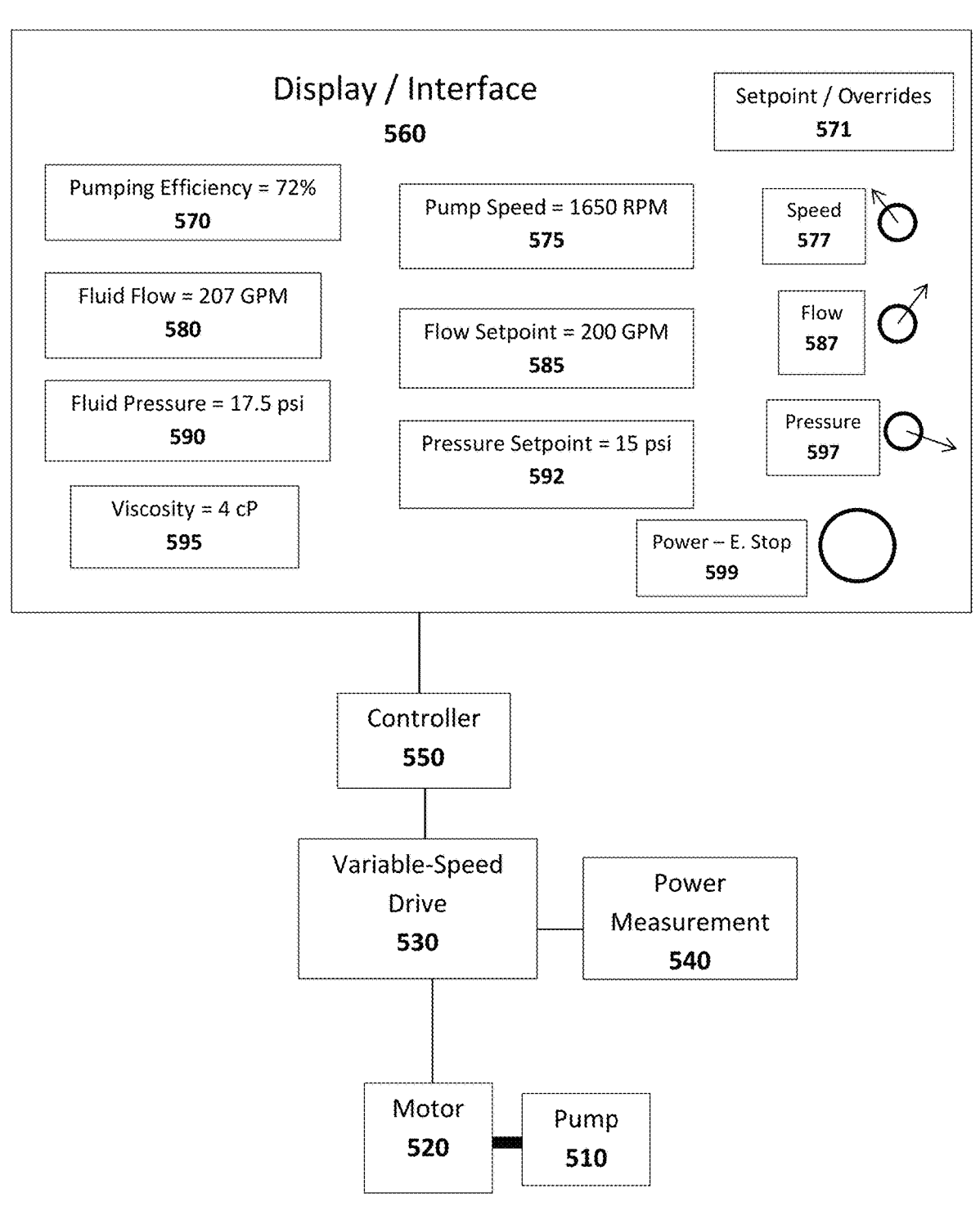
FIG. 1 depicts a block diagram of components comprising the present invention; Display/Interface 560 is optional.

FIG. 1 shows a block diagram of an embodiment of the present invention wherein controller 550 controls variable-speed drive 530 and thereby controls the speed of motor 520 which is rotationally coupled to a machine, shown as pump 510. Power measurement 540 is shown to be performed in conjunction with variable-speed drive 530. Display/interface 560 is shown to comprise a display for system parameters including: pumping efficiency 570, fluid flow 580, fluid pressure 590, viscosity 595 and pump speed 575. Input parameters are shown to be flow setpoint 585 and pressure setpoint 592. Setpoint/overrides 571 are shown as speed 577, flow 587 and pressure 597; power—E. stop 599 is also shown on the example control interface. The setpoint/overrides 571 may permit manual adjustment of system parameters in override mode or may permit adjustment of setpoints for flow 587 or pressure 597 in setpoint mode. Aspects of the present invention provide a methodology to measure and adjust variables including pumping efficiency 570, and subsequently identify a pump speed at which maximum pumping efficiency 570 occurs. The system may thereby operate in automatic mode wherein a predetermined best operating point (BOP) or threshold criterion (such as maximum-efficiency) has been defined. Display/interface 560 may be optional.

FIG. 1 illustrates the display of many plausible quantitative measurements or system parameters (efficiency, flow, pressure, viscosity, etc.) enabled by frequency domain analysis. Pumping efficiency herein may be construed to mean: machine output work #motor input work (on a rate or per time basis); therefore any motor inefficiencies may contribute to (decrease) measured or displayed efficiency. However, the calculation, display and/or machine-speed setpoint control of "pumping efficiency" is of particular value in minimizing electric costs. Pumping efficiency may be ratiometrically determined by calculating the ratio of pumping power #motor input power; when this ratio and the motor input power are known, then the calculated efficiency may be displayed or employed for motor-speed setpoint control. An embodiment of the present invention comprises the determination of machine efficiency at a plurality of motor speeds and subsequently operating the machine at the speed at or near the maximum measured efficiency. Any remaining system parameters representatively displayed through display/interface 560 may be similarly calculated; however, additional data may be required including: calibration constants or predetermined ratiometric constants (as may be determined through experimentation) and/or ancillary process instrumentation (not shown).

Figure 2:
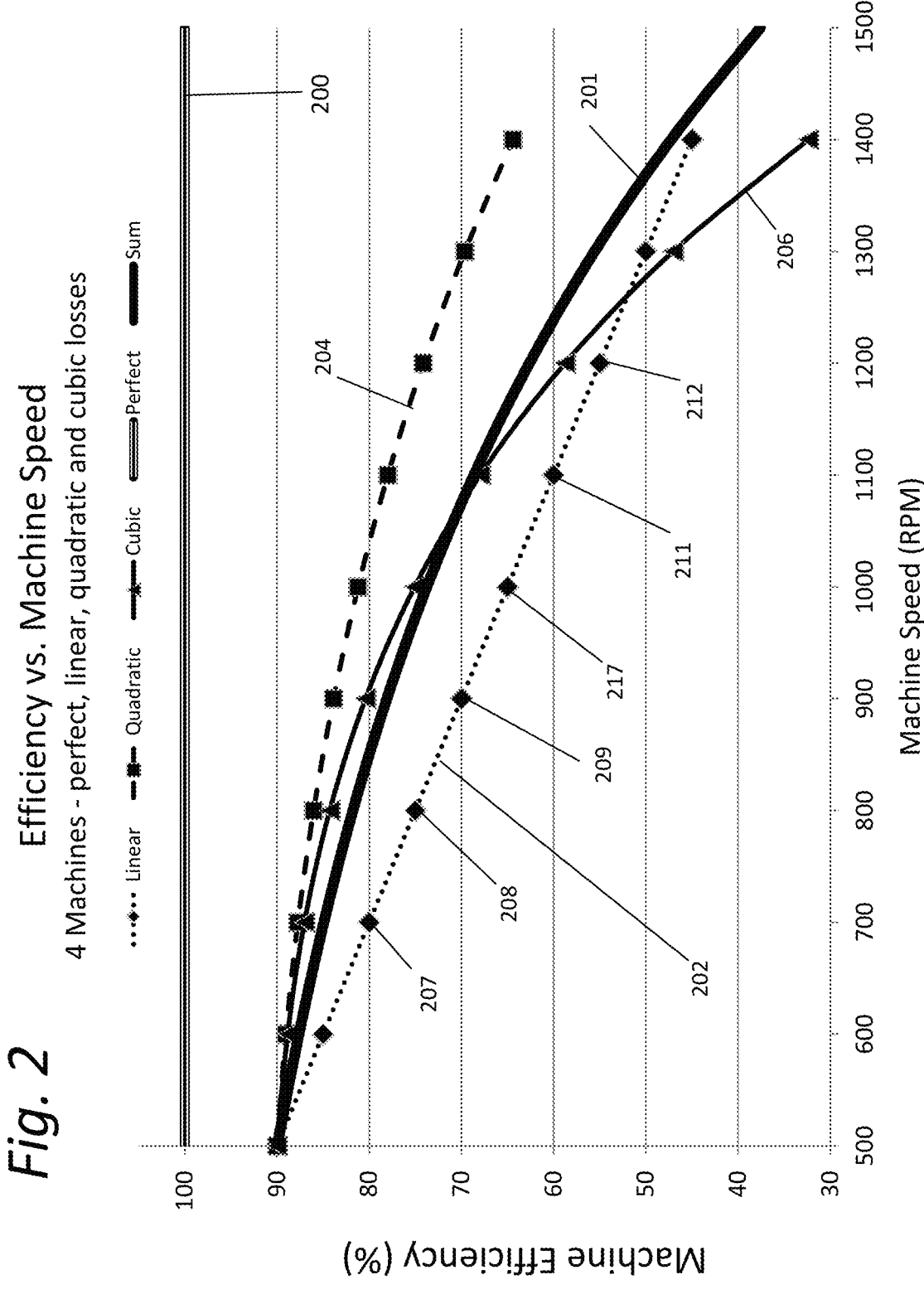
FIG. 2 graphically depicts example machines wherein machine efficiency is a function of machine speed.

FIG. 2 graphically depicts an example of measured/calculated machine efficiency for four example machines; while such machines are unlikely to exist, they serve as an introduction the theory and methodology of frequency domain analysis. The four example machines are: (1) perfect machine 200, with 100% efficiency at all motor speeds; (2) linear machine 202, with efficiency decreasing linearly with motor speed; (3) quadratic machine 204, with efficiency decreasing quadratically with motor speed, and (4) cubic machine 206, with efficiency decreasing cubically with motor speed. The power required to simultaneously supply the three example real machines (i.e., not perfect) may be measured and the overall efficiency of the total of three example real machines combined may be determined. Sum of machines 201 illustrates either (1) one measurement of the three example real machines operating simultaneously, or (2) the sum of three measurements taken, one for each individual machine. In cases where a single measurement was obtained (case 1) it was heretofore generally not possible to determine the efficiency contribution of each machine. Aspects of the present invention solve a similar problem: to decompose the summation of efficiencies (or work performed) into constituent parts such that the power consumption of a cubic machine may be distinguished from the power consumption of a quadratic machine which may be distinguished from the power consumption of a linear machine.

The preceding example summed the efficiencies of three non-perfect machines; however a single machine may exhibit the characteristics of sum of machines 201 such that cubic, quadratic and linear behavior may be simultaneously exhibited by the single machine. Aspects of the present invention may "decompose" the input power to machine into cubic, quadratic and linear constituents. An ideal linear machine may consume power consistent with only linear constituents (the quadratic and cubic constituents may be approximately zero). This ideal linear machine behavior may be consistent with phenomena including: dynamic friction, viscous drag etc. If the ideal linear machine is known to overcome dynamic friction or viscous drag (in the performance of the machine task), then the power consumption characteristics of the machine may be determined to be consistent with an ideal linear machine. However, if the ideal linear machine exhibits non-linear power consumption characteristics, then the machine may be performing a task that is not consistent with the machine's intended function. An example is an ideal linear machine which exhibits characteristics of an ideal quadratic machine above a certain speed threshold; the machine may consume power in a linear fashion (with speed) below a observed transition speed (e.g., below 1,000 RPM), and that same machine may consume power in a quadratic+linear fashion above that observed transition speed. Therefore, at or about the observed transition speed (e.g., 1,000 RPM) the machine begins to take on quadratic behavior. A quadratic power consumption curve is consistent with the phenomenon of pressure drag, where drag increases with the square of the speed. The ideal linear machine may be inferred to incur losses including viscous friction below approximately the observed transition speed (e.g., 1,000 RPM) and incur additional losses including pressure drag (and viscous drag) at speeds greater than the observed transition speed. In this example, the ideal linear machine exhibits behavior the observed transition speed and exhibits linear+quadratic behavior above the transition speed range. Aspects of the present invention may identify a transition speed of the previous example; the present invention may also evaluate the linear/quadratic/cubic nature of power consumption at a plurality of speeds and determine one or more speeds which best represent machine designer's operator's intentions.

FIG. 2 graphs the efficiencies of a perfect machine and three example real machines. It is important to note that, in FIG. 2, cubic machine 206 acts as a cubic machine 206 throughout the speed domain (frequency domain); the depicted "curvature" is shown to continuously increase throughout the domain. This is in contrast to linear machine 202, which is shown to exhibit zero curvature throughout the domain. Quadratic curvature may be a function of frequency at a point. Use of the term curvature is inclusive of observable changes (in radius of curvature) which may be characterized, as well as the formal mathematical definition of eq. 19. Cubic machine 206 exhibits "cubic curvature" (cubic curvature is continuously varying curvature with speed), quadratic machine 204 exhibits "quadratic curvature" (curvature may be a function of frequency at a point), whereas linear machine 202; a "straight line," does not exhibit curvature. Curvature (including curvature at a point) may be quantified as shown in eq. 19. Aspects of the present invention may measure the curvature at a plurality of speeds to compare (e.g., ratiometrically) how the curvature of machine power consumption changes with speed.

The FIG. 2 graph of linear machine 202 indicates that power may have been measured at discrete speed values including 500 RPM, 600 RPM, 700 RPM, . . . , 1,500 RPM. Data point markers are provided in FIG. 2 corresponding to each measurement speed. A plurality of data point markers are identified for linear machine 202: linear at 700 RPM 207, linear at 800 RPM 208, linear at 900 RPM 209, linear at 1000 RPM 217, linear at 1100 RPM 211, linear at 1200 RPM 212. If the curvature at each of these points is measured, a constant value of approximately zero may be the expected value. Measurement (or observation) of the curvature of quadratic machine 204 and cubic machine 206 may exhibit a changing curvature at each data point. Aspects of the present invention may comprise (1) measuring parameters including slope and curvature at a plurality of motor speeds and (2) identifying one or more motor speeds at which the curvature exhibits a quantifiable change between speed ranges. The slope at point linear at 1000 RPM 217 may be measured or evaluated (e.g., by finite difference techniques) as the difference between the values of flanking points (e.g., linear at 1100 RPM 211 minus linear at 900 RPM 209) divided by the difference in motor speeds (e.g., 1100–900=200); this is a central difference technique, embodiments of the present invention may also include one sided finite difference techniques. To evaluate or measure the second derivative at point linear at 1000 RPM 217, additional flanking data points (e.g., linear at 800 RPM 208, linear at 1200 RPM 212 may be need to be included in the finite difference scheme. However, the second derivative of a measured parameter is also the first derivative of the first derivative of the parameter; therefore an array of data may be successively differentiated to find the first derivative, second derivative, third derivative, etc. Either technique to obtain higher order derivatives (higher order finite difference techniques or successive differentiation) may incorporate data from a plurality of flanking data points in order to determine measured parameters including slope and curvature. FIG. 2 graphically depicts efficiency (as a comprehensive indicator of machine performance) as a function of machine speed. Frequency domain analysis may quantitatively measure machine efficiency; however a first task may be to measure the work performed by the machine in order to calculate efficiency. The curvature of data point linear at 1000 RPM 217, or any of the plurality of data points of FIG. 2, may not generally be measured without data from a plurality of flanking data points; inclusion of a greater number of data points may improve the inherent accuracy (order of magnitude of error, $O(\omega)$).

Disclosure of the present invention includes the observation, measurement and/or calculation of curvature at a point, however preferred embodiments "condense" or "distill" relevant information into a cubic polynomial of the form: $A\omega^3+B\omega^2+C\omega+D$. Thereby, the curvature characteristics of any measured data may be decomposed into subsets including: cubic nature, quadratic nature, linear nature and constant. The cubic polynomial of examples supplied here may be termed a mathematical model, governing equation or other terms including any functional dependency or functional relationship. By numerically analyzing experimental data (herein typically motor input power) a machine's power consumption characteristics may be expressed and quantified as "cubic-like," "quadratic-like," "linear," or "constant;" other functional dependencies (or mathematical models) may include terminology which may include "exponential," "logarithmic," or "sinusoidal," etc. to describe features including slope and curvature.

Figure 3:
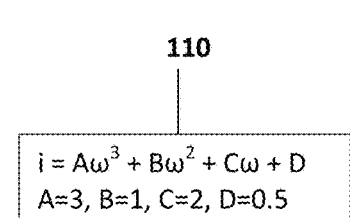
FIG. 3 depicts a numerically constructed motor current relationship which is analyzed by numerical differentiation.

FIG. 3 shows current analysis 100 of a representative algebraic/third order polynomial current model 110. In this example, the polynomial coefficients A, B, C and D are assigned the example values of 3, 1, 2 and 0.5, and remain constant throughout the domain. It may be inferred from eq. 3 that A (the $\omega^3$ coefficient) represents the portion of electric power which exhibits a differential relationship consistent with pump power. It may be inferred from eq. 2 that B (the $\omega^2$ coefficient) represents the portion of electric power which exhibits a differential relationship consistent with a change in pressure or pressure drag. It may be inferred from eq. 1 that C (the $\omega$ coefficient) represents the portion of electric power which exhibits a differential relationship consistent with a change in flow or viscous drag. Coefficient D may be inferred to represent the portion of electric power which exhibits a constant functional relationship with (independent of) frequency and represents constant loss to inefficiencies. It is important to note that the cubic polynomial coefficients (A, B, C and D) remain constant throughout the domain of this example dataset of FIG. 3; in general, these coefficients may assume different values at each value of $\omega$. In practice, the coefficients may be assumed to be variable with respect to frequency and each coefficient may be denoted with a frequency subscript such as $A_{990\ Hz}$, $A_{1000\ Hz}$, $A_{1010\ Hz}$, $B_{1000\ Hz}$, $C_{1000\ Hz}$, etc. Herein, it is understood that the coefficients are functions of frequency and the subscripts may be omitted for clarity. To facilitate computation of data in matrix form, the coefficients may be denoted as arrays or matrices such as: A(990), A(1,000), B(1000), C(1000), etc. Another nomenclature which may be used herein employs the use of an index counter (e.g., i, j, m, etc.); examples include A(i), wherein A(32) denotes coefficient A evaluated at the $32^{nd}$ data point, where index loop counter, i=32).

Pumping system losses (as well as pumping work) of all types may assume a differential relationship to frequency which may include: constant, linear, squared, cubic, logarithmic, exponential, power, etc. Differentiation of the affinity laws provides a set of 4 equations in 4 unknowns which generally has a unique solution. The mathematical model for analysis of a pump is chosen to be a cubic polynomial; the differential current-frequency relationship is cubic in nature and can be represented by the 4 polynomial coefficients A, B, C and D at a particular frequency. The actual current-frequency relationship of a pump system will generally deviate from the cubic polynomial model. Direct frequency domain analysis of motor current may be used as a method to curve-fit the data to cubic polynomial because: (reason 1) the affinity laws provide for a generally cubic functional relationship between motor current and pump power; and (reason 2) numerical differentiation of experimental data provides the closed-form solution to eq. 9 for the coefficients A, B, C and D which may be readily computed at any time. Reason 1 provides that a cubic polynomial model is among the best guesses for the functional relationship between motor current and frequency for a particular application such as a centrifugal pump. Reason 2 provides a computationally efficient approach to monitoring and assessing pump performance. Prior art may provide comparing motor current data to library, reference or historical values and also more elaborate methods including Fast Fourier Transform (FFT), spectral and back EMF analyses, etc., all of which may be expensive and computationally intensive. Motor current analysis of the present invention readily enables the determination of five measured values (e.g., A, B, C, D, and i), which may be representative of characteristic pump inefficiencies. Thereby a single measured value (the current) is numerically decomposed into a sum of 3 functions of frequency and 1 constant at each discrete frequency $\omega$. Curve-fitting techniques may be assessed for error or "goodness of fit;" correlation coefficients are generally calculated to quantify the fidelity of the generated curve to the experimental data. Direct frequency domain numerical differentiation of the present invention also provides a goodness of fit correlation coefficient in the error between the experimental data, i, and the evaluated cubic polynomial of eq. 9, as expressed in eq. 17:

$$Error = i - A\omega^3 + B\omega^2 + C\omega + D \qquad \text{Eq. 17}$$

After the coefficients A, B, C and D are calculated (at a point or discrete frequency $\omega$), eq. 9 may be evaluated and subtracted from the measured value of i. In cases where the error is small, it is inferred that the cubic polynomial model accurately reflects the experimental data; this is similar to a correlation coefficient of many regression analyses. In cases where the error is large, it may be inferred that the cubic polynomial model is inadequate as a mathematical model. The computational efficiency of the present invention enables the use of readily available and inexpensive equipment such as an Arduino, Raspberry Pi, etc. which may be utilized with minimal programming effort and skill required.

Numerical current model 120 shows the calculated value of motor current (i, as representative of motor power) as a function of frequency. As expected, at $\omega$=1 (along with $\omega^2$=1 and $\omega^3$=1), i=6.5, this is the sum of polynomial coefficients A, B, C and D. The calculated value of motor current is subjected to numerical differentiation to obtain the first, second and third derivatives, shown in numerical derivatives 130. Numerical techniques such as presented in eq. 6 and eq. 7 may be used. Eq. 13 provides that i'''=6A, so the third numerical differentiation provides the value for A. The remaining coefficients may be obtained by back substitution and are presented in polynomial coefficients 140; note that the coefficients are frequency independent, such that $A_{0.8\omega}$=$A_{0.9\omega}$=$A_{1.0\omega}$=$A_{1.1\omega}$=$A_{1.2\omega}$ in this pedagogical example. Thus it is demonstrated that numerical differentiation of a cubic polynomial provides a closed form solution to determine the coefficients, and each plurality of coefficients may be defined for each discrete frequency $\omega$. In this example case, a cubic function is input (with arbitrary coefficients), those arbitrary coefficients are correctly determined by numerical differentiation. Eq. 3 asserts that pump power varies with $\omega^3$, any input power not converted to work (the product of pressure and flow) is lost to heat in the form of friction, $i^2r$, viscous losses, etc. Coefficient A represents the $\omega^3$ functional relationship of the data and therefore may represent the pumping power in the cubic polynomial model.

Eq. 18 is an industry-standard equation for pump efficiency ($\eta$), where $\gamma$ is the specific gravity, assumed to be constant at 1.0 for water; the analysis of fluids of different specific gravity is tacitly included in this disclosure.

$$\eta = \text{Pump Efficiency} = \frac{pq\gamma}{\text{Shaft Input Power}} \times 100\% \qquad \text{Eq. 18}$$

Pump power 150 shows that the pump efficiency rises from 36% at $\omega$=0.8 to 54% at $\omega$=1.2. This may be explained because frictional losses of any origin are generally not cubic in nature; coefficients B, C and D are better representative of friction models. Increasing the pump speed increases the pumping power at a greater rate than the (squared, linear and constant) models predict. With constant polynomial coefficients throughout the domain, the calculated efficiency is a monotonically increasing function that approaches 100% as $\omega$ approaches infinity. In practice (using experimental data), the polynomial coefficients continuously change throughout the domain and an efficiency maximum may be observed and identified in embodiments of the present invention.

Figure 4:
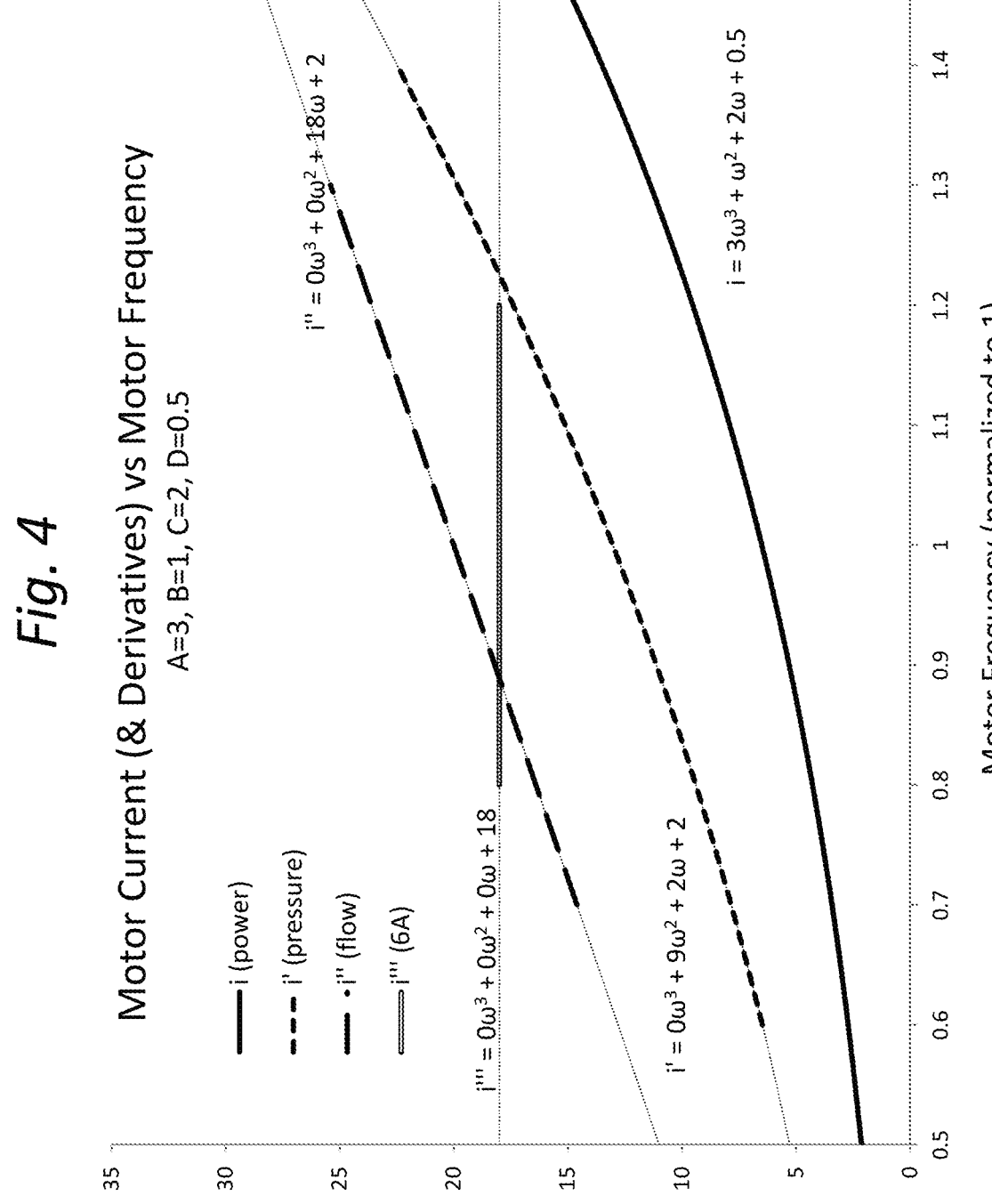
FIG. 4 graphically depicts the numerically constructed motor current, along with numerically calculated first, second and third derivatives.

FIG. 4 graphs i (from numerical current model 120) and i', i" and i''' (from numerical derivatives 130). The current model (i) shows cubic polynomial curvature, the first derivative (i') shows less distinct curvature, the second derivative (i") is linear with slope of 18 and intercept of 2 and the third derivative (i"") is the constant value of 18. Numerical current model 120 shows the example frequencies to be normalized to 1 and representative of any general centrifugal pump speed from less than 1,00 RPM to in excess of 75,000 RPM. The frequency domain is shown normalized to one and having values between 0.5 and 1.5; this domain is selected so that the curvature of each line is visible in the graph of FIG. 4. The frequency increment ($\Delta\omega$) of numerical current model 120 is 0.1. In practice, the selection of $\Delta\omega$ is under the designer's control and may employ considerations including power, pressure, flow, nominal pump speed, signal to noise ratio (SNR), etc.

Figure 5:
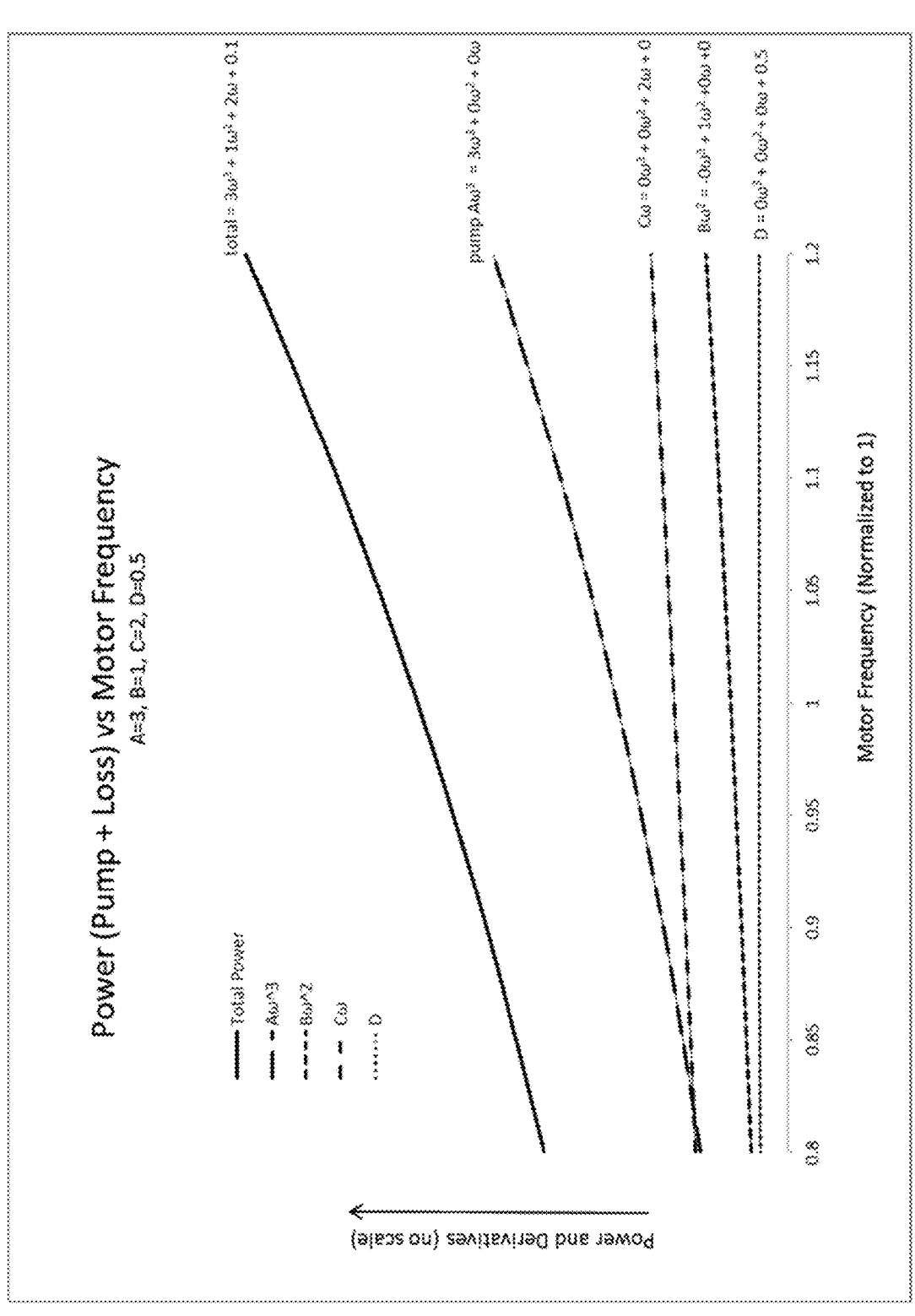
FIG. 5 graphically depicts example total power of a pump decomposed by superposition or linear combination into the theoretical pump power ($\Delta\omega^3$), along with the $\omega^2$, $\omega$ and constant components.

FIG. 5 graphs the total power and the constituents of the decomposition into cubic, squared, linear and constant components. As in FIG. 4, the total power line has cubic polynomial curvature ($i=A\omega^3+B\omega^2+C\omega+D$). The pump line has ($A\omega^3$) has pure cubic curvature ($i_A=A\omega^3$), the $B\omega^2$ line has pure squared curvature ($i_B=B\omega^2$), the $C\omega$ line is purely linear ($i_C=C\omega$) and line D is constant ($i_D=D$). The cubic polynomial of eq. 9 was selected because of the relationship asserted by eq. 1 through eq. 3; in practice, higher or lower order polynomials may be selected as the mathematical model of the differential current-frequency relationship.

The foregoing illustrates an embodiment and a methodology of using a polynomial function with constant coefficients throughout the domain; computationally, the values of each coefficient A, B, C and D may be determined (at each discrete frequency $\omega$) by numerical methods including finite difference. Subjected to similar analyses, machinery does not generally exhibit constant polynomial coefficients throughout the domain. Nonetheless, the polynomial coefficients may be calculated "at a point" or "at a (discrete) frequency" by calculating successive derivatives of the experimental data. Polynomial coefficients that are calculated at a point (e.g., $\omega/\omega_0=1.1$, where $\omega_0$ is an arbitrarily selected constant) may be symbolized with notation such as A(1.1), B(1.1), C(1.1), D(1.1) where the term in parentheses denotes the frequency at which the coefficients are calculated in this example; alternative notation, nomenclature and symbols may be used as may be computationally efficient. Coefficient A(1.1) may be calculated by successive numerical differentiation of raw motor current/power vs. frequency data. The raw data utilized for this calculation may comprise a subset comprising data elements flanking the point being evaluated. Coefficient A(1.1) may be calculated using the raw data subset {i(0.9), i(1.0), i(1.1), i(1.2) and i(1.3)}; all other raw data may be excluded such that only raw data local to point A(1.1) is used in the calculation thereof. The calculated value of A(1.1) quantitatively describes the cubic nature of the measured raw data at a point ($\omega/\omega_0=1.1$). Thus, for a centrifugal pump, the calculated value of coefficient A($\omega$=specific frequency) may be a quantitative descriptor of the ideal/cubic nature of the experimental data at that specific frequency.

For experimental data collected upon a machine, such as a centrifugal pump, coefficients (e.g., A(0.9), A(1.0), A(1.1), etc.) generally do not remain constant throughout the domain. For a centrifugal pump, pumping power is ideally correlated to $\omega^3$ and may be represented by $\alpha\omega^3$, where a is an arbitrary constant or "scaling factor" characteristic of a particular pump. Aspects of the present invention may employ the postulate that polynomial coefficient A is proportional to a, such that measuring A results in a measurement of $\alpha$ (multiplied by an arbitrary constant).

Pump curves are generally provided by pump manufacturers to aid the designer in selecting the correct pump for the application. Typically, a pump is selected which operates at or near maximum efficiency given the anticipated head and flow requirements of the application; of course, these requirements may change with time (e.g., annually, seasonally, monthly, daily, hourly, etc.). The pump curve may indicate the efficiency associated with changes in shaft speed, head or flow. Eq. 1 and eq. 2 provide a theoretical relationship between shaft speed, head and flow; pump curves provide a manufacturer-supplied (experimental) relationship between these 3 variables. With any computation of the coefficients A, B, C and D, the error between the polynomial model and the pump curve may be calculated. If this measured error is small, then the pump may be inferred to be operating within the manufacturer's specifications; if this error is large, then the pump or pump system components may be inferred to be out-of-specification, failing or failed. A pump curve exhibits curvature (K) which may be measured or provided by the manufacturer. The curvature of the experimental data may be calculated by eq. 19:

$$\kappa = \frac{|i''|}{\left(1 + [i']^2\right)^{\frac{3}{2}}} \qquad \text{Eq. 19}$$

where i' and i" may be calculated by the methods comprising the present invention. Eq. 19 provides another pump parameter (curvature, K) which is numerically calculated and may be correlated to manufacturer supplied pump curves for correlation. Quantifying the error between the experimentally measured curvature and the curvature of the pump curve provides a quantification of the deviation of the actual pump performance from the design pump performance.

The present invention thereby provides a plurality of measured and/or derived variables (e.g., A, B, C, D, Error and curvature) from a single measured variable (i) by frequency domain analysis of motor current. Thus a single measured variable (i) may be decomposed into a plurality of diagnostic indicators of pump performance, enabling the pump efficiency to be increased by setpoint control of motor speed, such as by controller 550. The interrelationships between and changes to these diagnostic indicators may be used to infer the nature and degree of changes in pump performance. These diagnostic indicators may be quantitatively correlated to pump affinity laws, historical data as well as manufacturer supplied performance data for a pump. Applying the methods of the present invention to hypothetical pump operating at 100% efficiency may yield the following coefficient values: A=arbitrary constant, B=C=D=Error=0. In practice, the non-zero values of B, C, D and Error may be deterministic of: viscous losses, pressure drag, dynamic contact frictional losses, motor $i^2R$ losses, in addition to flow anomalies including occluded or blocked flow. Worn, failing or failed components (e.g., broken belt, broken coupling, worn bearings, failing motor winding insulation, etc.) may be detected by methods including quantitative ratiometric analyses and of coefficients B, C, D and Error.

Pump curves obtained by manufacturers generally relate the head, flow and efficiency; the efficiency is given in eq. 18 as the product of head and flow divided by the input power. Correction factors for viscosity may or may not be incorporated pump curves; however the Hydraulic Institute Viscosity Correction Chart provides correction factors for head ($C_H$), flow ($C_Q$) and efficiency ($C_\eta$). As viscosity is increased, $C_H$ decreases from 1 to approximately 0.8, $C_Q$ decreases from 1 to approximately 0.6 and $C_\eta$ decreases from 1 to approximately 0.2. This provides an approximate ratio of 2:6:8 for the efficiency: flow: pressure ratio may be inferred to be consistent with an increase in viscosity. In cases where the ratio of A:C:B is changed in a ratio of approximately 2:6:8, it may be inferred that a quantifiable increase in fluid viscosity is detected. The magnitude of the increase of A, B and C may be proportional to the magnitude of the increase in viscosity.

It may be inferred from the affinity laws (eq. 1 through eq. 3) that experimental determination of the value of coefficient B may be reflective of the frequency-pressure differential relationship. Deviation of coefficient B from historical or reference values may indicate that pressure is not increasing/decreasing with frequency as anticipated; this may be due to phenomena including pressure drag, cavitation, flow restriction, etc. . . . It may likewise be inferred that coefficient C is reflective of the frequency-flow differential relationship; this may be due to phenomena including viscous or dynamic friction drag, cavitation, flow restriction, etc. Deviation of coefficient C from historical or reference values may indicate that the flow is not increasing/decreasing with frequency as anticipated. Coefficient D may represent fixed losses that are not accounted for in the pump affinity laws. Deviation of coefficient D from historical or reference values may indicate a failed or failing component with losses that are independent of frequency. The present invention thereby provides diagnostic information regarding the pump, the fluid and all system components.

Many pumping systems are designed to operate across a broad range of flow and pressure conditions; an example is a municipal water system where water demand is low between midnight and 6 a.m.; high between 6 a.m. and 7 p.m., and moderate between 7 p.m. and midnight (as examples). A pump operating at constant speed under these conditions will ideally exhibit acceptable efficiency throughout the range of flow demand; however, that pump has an optimum or "best operating point" where the efficiency is at or near maximum. If the flow demand is decreased from this "best operating point" then the system pressure may generally increase as efficiency decreases. If the flow demand is increased from this "best operating point" then the system pressure may decrease as the efficiency decreases. Variable speed motors may be outfitted to such pumping systems of prior art, but a complex control algorithm and additional instrumentation may be required for these prior art applications. Embodiments of the present invention may continuously or intermittently update the pump speed such that a best operating point (optimum speed given the flow demand) may be maintained throughout any change in flow demand.

A cubic polynomial is selected as a well-conceived embodiment for analysis; it is 3 times differentiable yielding a linear set of equations which may be solved algebraically. Other embodiments comprise mathematical models which may include functions such as an exponential function, as presented in the set of equations designated eq. 20:

$$i = Ye^{Z\omega}; i' = YZe^{Z\omega}; i'' = YZ^2 e^{Z\omega}; \text{etc.} \qquad \text{Eq. 20}$$

This set of equations may be numerically evaluated and the exponential coefficients (Y and Z) may be algebraically determined by eq. 21:

$$Z = \frac{i'}{i}; Y = \frac{i}{e^{Z\omega}} \qquad \text{Eq. 21}$$

Eq. 9 and eq. 20 may be analyzed independently or they may be combined as in eq. 22:

$$i = A\omega^3 + B\omega^2 + C\omega + D + Ye^{Z\omega} \qquad \text{Eq. 22}$$

which is a linear combination of a cubic polynomial and an exponential function. Three embodiments of the present invention are thereby disclosed: (1) cubic polynomial model, (2) exponential model, and (3) linear combination of cubic polynomial and exponential models. Any differentiable and well-behaved function is a candidate for the mathematical model selected for analysis. The disclosed embodiments specifically demonstrate frequency domain analysis of motor current; more generally, the invention comprises similar analyses to other measured variables including pressure, flow, fuel consumption, etc.

Embodiments of the present invention comprise a methodology which includes that the speed-power-efficiency relationship for any variable-speed machinery may be modeled as a linear combination of differentiable functions. At points in the frequency domain (1 or more shaft speeds), numerically calculated parameters (e.g., any number of speed-power derivatives, curvature, efficiency, etc.) may be used to characterize new, old, faulty, failing or failed equipment by determining coefficients (e.g., A, B, C, D, Y, Z, etc.) of assumed functions or linear combinations thereof. Subsequently, relevant performance parameters including n (efficiency at a frequency), K (curvature at a frequency) may be calculated as required by the application.

Any machine (e.g., pump, milling machine, etc.) may or may not exhibit a governing equation or otherwise known empirical or experimental relationship which relates how the supplied shaft work is distributed between work (e.g., fluid flow or cutting, etc.) and loss (e.g., viscous dissipation, heat, etc.). In the case of a pump, the affinity laws (Eq. 1 through Eq. 3) provide governing equations which may be valid in an idealized frictionless system pumping an inviscid fluid. However, the experimental or real pump is neither ideal nor frictionless and the process fluid exhibits non-zero viscosity; therefore deviations from the system behavior adhering to the governing equations are inevitable. Aspects of the present invention decompose the measured input power into constituents including: pumping power (coefficient A, which is predicted to increase with $\omega^3$), pressure or pressure drag (coefficient B, which increases as $\omega^2$), flow or viscous drag (coefficient C, which increases as w) as well as other factors (coefficient D) which may be independent of the shaft speed, w. In an ideal or perfect pumping system, coefficient A may be expected to have a finite value and coefficients B, C and D may be expected to have values which may be approximately zero (within experimental error). In an ideal pumping system (adhering to the affinity laws, Eq. 1 through Eq. 3), coefficients A, B, C and D are independent of shaft speed, w; experimentally, on real pumps, the coefficients may be strong functions of shaft speed. Embodiments of the present invention may experimentally determine one or more optimum combinations of the measured coefficients.

The present invention may comprise defining a "Best Operating Point," or BOP; BOP definitions may be fixed, variable, ratiometric or any user-supplied definition. As a first example considering a pump, the BOP may be defined as the shaft speed, $\omega$, which maximizes coefficient A(with respect to shaft speed, $\omega$), regardless of the associated changes to the remaining coefficients. This example definition of a BOP (coefficient A at maximum) may be considered appropriate because as coefficient A diminishes from maximum, then the system is responding less like an efficient pump and more like an inefficient pump (because of greater deviation from the ideal response in accordance with the governing relationship). As a second pump example, BOP may be defined based upon the quotient or difference of/between coefficient B(which may be associated with phenomena including pressure drag) and coefficient C(which may be associated with phenomena including viscous drag) may be used to define a second example BOP. The second pump example may give rise to BOP definitions including: (B/C<K1), (K2<B/C<K3), (B/C<K4 AND A>K5), where the Kn's are arbitrary constants which may be experimentally determined. Another example determination of BOP may include the comparison of a specific coefficient (e.g., A, B, C, D, etc.) with that specific coefficient at a different frequency; examples may include: $A(1.1) \div A(1.2)$, $C(0.8) - C(0.9)$, $(A(1.1) + B(1.1) \div (A(1.0) + B(1.0))$, etc.

Figure 6:
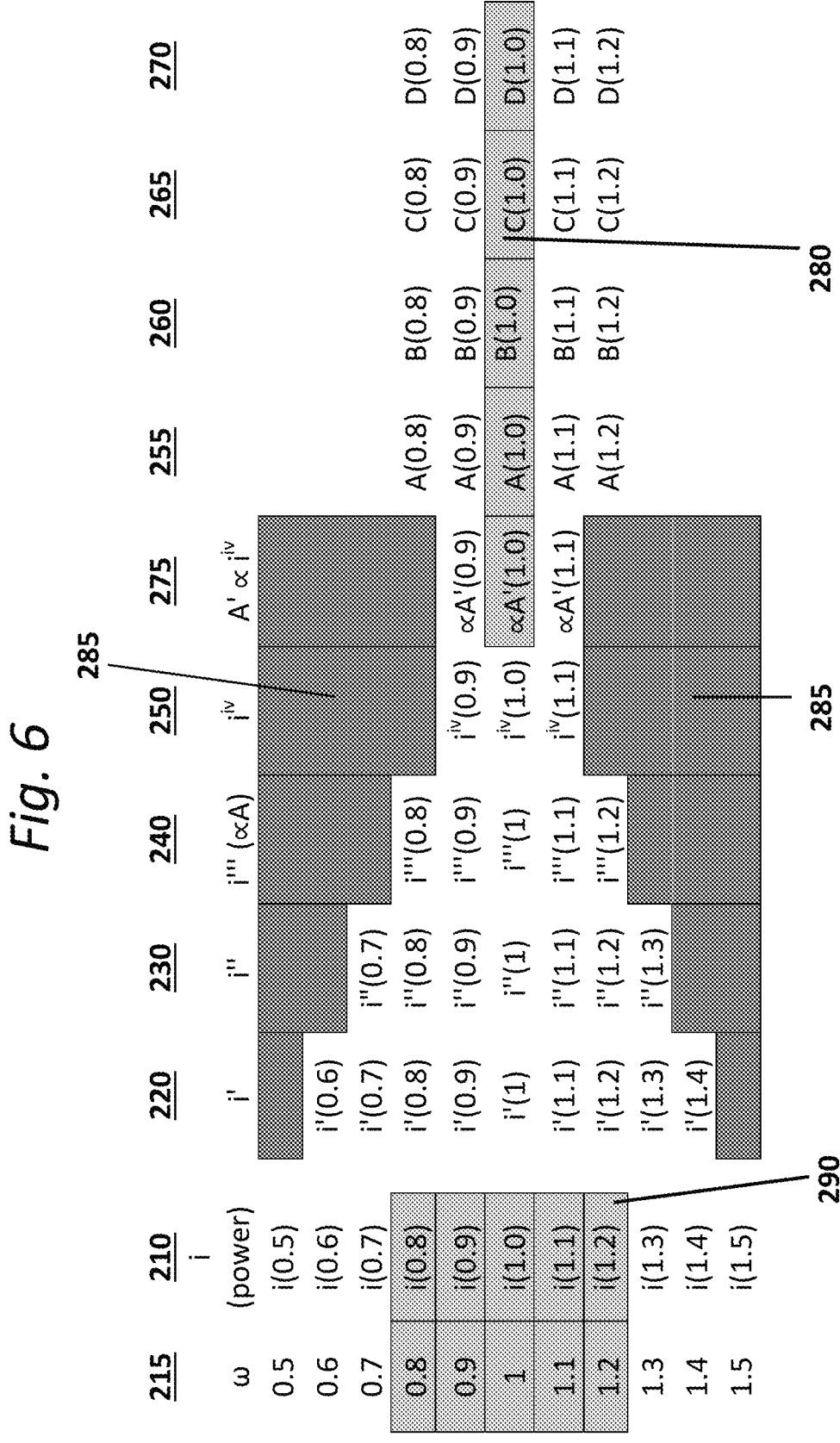
FIG. 6 depicts a tabular example format for experimental data (i, or power) at 11 frequencies.

FIG. 6 provides a sample data array such as may comprise the present invention. FIG. 6 employs notation such that cell identified as A(1.1) is populated with the measured value of coefficient A at (normalized) frequency 1.1. Experimental data (raw data, first data set) is shown in motor current (i) 210 and frequency 215; in this example, the machine was operated at 11 different speeds ($0.5 \leq \omega/\omega_0 \leq 1.5$). Neglecting data endpoints, first derivative (i') 220, second derivative (i'') 230, third derivative (i''') 240 and third derivative (iv) 250 are numerically calculated in respective columns; these data sets may be termed successive, subsequent or second data sets. An example computational technique is to first calculate i'(1.4), followed by i'(1.3), i'(1.1), i'(1.0), . . . to i'(0.5); thus "marching" up or down motor current 210 column; this process generates 1st derivative 220 column. Successive derivatives may be calculated by marching up or down successive columns to calculate successive derivatives.

FIG. 6 illustrates an example of data collection and subsequent calculations of the present invention. The motor/machine/pump speed, $\omega$, is normalized to 1; the data ranges from $\omega=0.5$ to $\omega=1.5$ in increments of 0.1, as shown in FIG. 6, frequency 215 column. Motor current 210 column, labeled i(power), is populated with experimental data; each cell in this column may be populated with the experimentally measured current at each value of w. First derivative 220 column (labeled i') contains numerically calculated derivatives of motor current (i); thus, first derivative 220 column is the first derivative of motor current 210 column. No derivative is shown to be calculated for i(0.5) and i(1.5) because the error within these cells may be of a greater order (one-sided difference vs. central difference schemes). All cells with greater error 285 are not populated in FIG. 6; of course these cells could be populated with values of greater error, but preferred embodiments elect to omit these cells from computation. Second derivative 230 column is likewise a derivative of first derivative 220 column; third derivative 240 column is a derivative of second derivative 230 column and fourth derivative 275 column is the first derivative of third derivative 240 column. With each successive derivative taken, the number of populated cells in a column is diminished (in this case, by two per iteration). In the example of FIG. 6, motor current is measured at 11 different frequencies; frequency 215 column and motor current (I, power) 210 are populated with 11 entries. First derivative 220 column is populated with 9 entries, omitting the endpoints where numerically approximating the derivative may incur greater error. Third derivative 240 column is therefore populated with 5 entries. With each successive derivative taken, preferred embodiments omit calculation of (boundary) cells of higher error, and so the data set is sequentially diminished in size. Of course this may be overcome by operating the motor at higher and lower speeds (expanding the domain) or in smaller increments, etc.

The center row of FIG. 6 containing the $\omega=1$ measurements, derivatives thereof and coefficients and identifies coefficients A,B,C,D and A' at $\omega=1$ 280. Data for item 280 290 identifies the corresponding data used to calculate coefficients A,B,C and D at $\omega=1$ 280. In the example of FIG. 6, calculation of coefficient A(1.0) draws data from 5 contiguous data points spanning $\omega=0.8$ to $\omega=1.2$. A minimum of 5 data points (including and flanking the frequency) may be required to calculate coefficient A; a minimum of 7 data points flanking coefficient A may be required to calculate A'. Eq. 13 provides that coefficient A is equal to the third derivative of power (i''') divided by a constant (6). Coefficient A is therefore proportional to i'''; by an arbitrary constant which may be denoted as $A \propto i'''$ for compactness by invoking the mathematical symbol for proportional to, $\propto$. The remaining coefficients (B, C and D) are also subject to arbitrary constants characteristic of a cubic polynomial. Defining the load on a machine with mathematical function other than a cubic polynomial (e.g., sinusoidal, logarithmic, exponential, etc.) will elicit different arbitrary constants. Direct reference to the arbitrary constants, specific to a chosen mathematical model, may be omitted herein for clarity.

Motor current 210 may be sequentially differentiated three (or more) times to obtain (experimentally-determined) coefficient A 255 column, from eq. 13; the remaining coefficients (B,C and D) may be calculated as shown in eq. 14 through eq. 16. Experimentally-determined coefficient A 255 is a term in eq. 9; the magnitude of coefficient A is quantitative with respect to the cubic nature of the experimental data. As coefficient A increases with $\omega$, it may be inferred that the experimentally-measured data exhibits a more cubic ($\omega^3$) curvature or characteristic, which may be inferred to be more adherent to the affinity law of eq. 3. Conversely, as coefficient A decreases with $\omega$, it may be inferred that the experimentally-measured data exhibits greater influence from the lower order terms (coefficients B, C, and D) which represent something other than pumping power as stated in eq. 3.

Taking a derivative of coefficient A(or calculating $i^{iv}$) will yield a positive, negative or zero slope; a positive slope being indicative of an increasingly cubic nature (more like an ideal pump), a negative slope being indicative of decreasingly cubic nature (less like an ideal pump) and a zero slope being indicative of a plateau or local extremum. Computationally, finding a plateau or local extremum may be accomplished by searching the data to identify a frequency, $\omega$, at which A' changes sign; this point may be identified as $\omega_{Amax}$, the frequency at which coefficient A may be (assumed to be) maximum. It follows that when coefficient A is a maximum at $\omega_{Amax}$ then the experimental data may provide a "best fit" to the affinity laws for the pump; it further follows that $\omega_{Amax}$ may be a speed at which maximum pumping efficiency occurs. Another example of a Best Operating Point (BOP) is therefore $\omega_{Amax}$; this frequency may be identified by finding the frequency at which the fourth derivative of the input power changes sign. It follows that taking the derivatives of the remaining coefficients (B,C and D) may provide further insight into the frequency-dependent trends of the lower order terms which may represent phenomena including: pressure drag, viscous drag, dynamic friction, etc. As an example, the derivative of coefficient B at $\omega=1$, which may be indicated by notation including B'(1.0), may be found by the evaluating the expression B'(1.0)={B(1.1)−B(0.9)}÷ (1.1−0.9).

Figure 7:
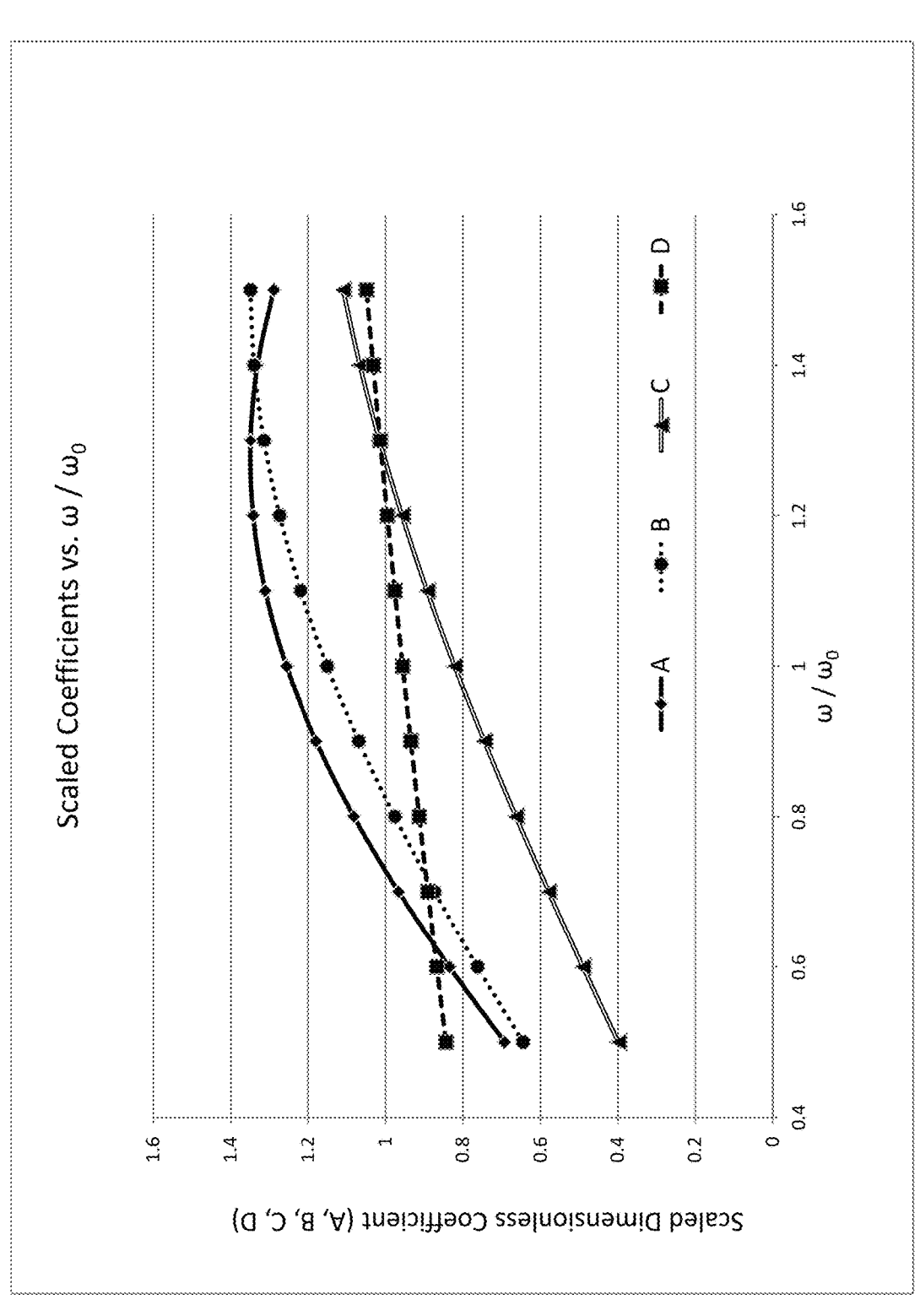
FIG. 7 graphically depicts example values of polynomial coefficients A, B, C and D, throughout a range of frequencies.

FIG. 7 shows example data showing continuously variable coefficients A, B, C and D over a range of frequencies; the coefficients have been scaled for illustration purposes. Coefficient A exhibits a maximum at approximately $\omega/\omega_0$=1.2; from the affinity laws (Eq. 1 through Eq. 3), it may be inferred that maximum pumping efficiency occurs this frequency because of the cubic prediction of the governing equation. Governing equations for other systems may predict linear, squared or quadratic dependence of power upon frequency. Experimental data may suggest other relationships including exponential, logarithmic, power, sinusoidal or any other mathematical function to which experimental data may be curve fit. Experimentation or a governing equation may be used to select and construct a mathematical model which may comprise aspects of the present invention. FIG. 7 provides multiple example candidates for a definition of best operating point (BOP) or a predetermined threshold value; examples including: (the maximum value of A, the maximum speed that A>B, the maximum speed that C>D, the maximum speed that B<1.25, etc.).

The foregoing examples were guided by the affinity laws (eq. 1 through eq. 3) to define a cubic polynomial model for experimental data collected upon a centrifugal pump; and to computationally determine the coefficients at a number of frequencies to identify a specific frequency at which a fourth derivative changes sign. In this example, a governing equations, the affinity laws (eq. 1 through eq. 3), provide an idealized model with constant and finite coefficient A and zero-valued coefficients B, C, and D. Experimentally coefficients A, B, C and D are all functions of frequency, $\omega$, and generally non-zero. Traditional experimental measurement of pumping power comprises simultaneously measuring pressure, flow and input power; the product of pressure and flow equals pumping power. Dividing this measured pumping power by the measured input power provides an experimental measurement of efficiency. This can be carried out over a range of frequencies and the efficiency of the pump (as a function of frequency) may be plotted. The methods of the present invention may identify or locate the maximum-efficiency pump speed without the need for traditional instrumentation such as pressure gauges/transducers and flowmeters. For a milling machine, it may be theorized, postulated or experimentally determined that the efficiency exhibits a power-series relationship such as $\eta \approx F\omega^{1.5}$, where F is an experimentally determined arbitrary constant.

Figure 8:
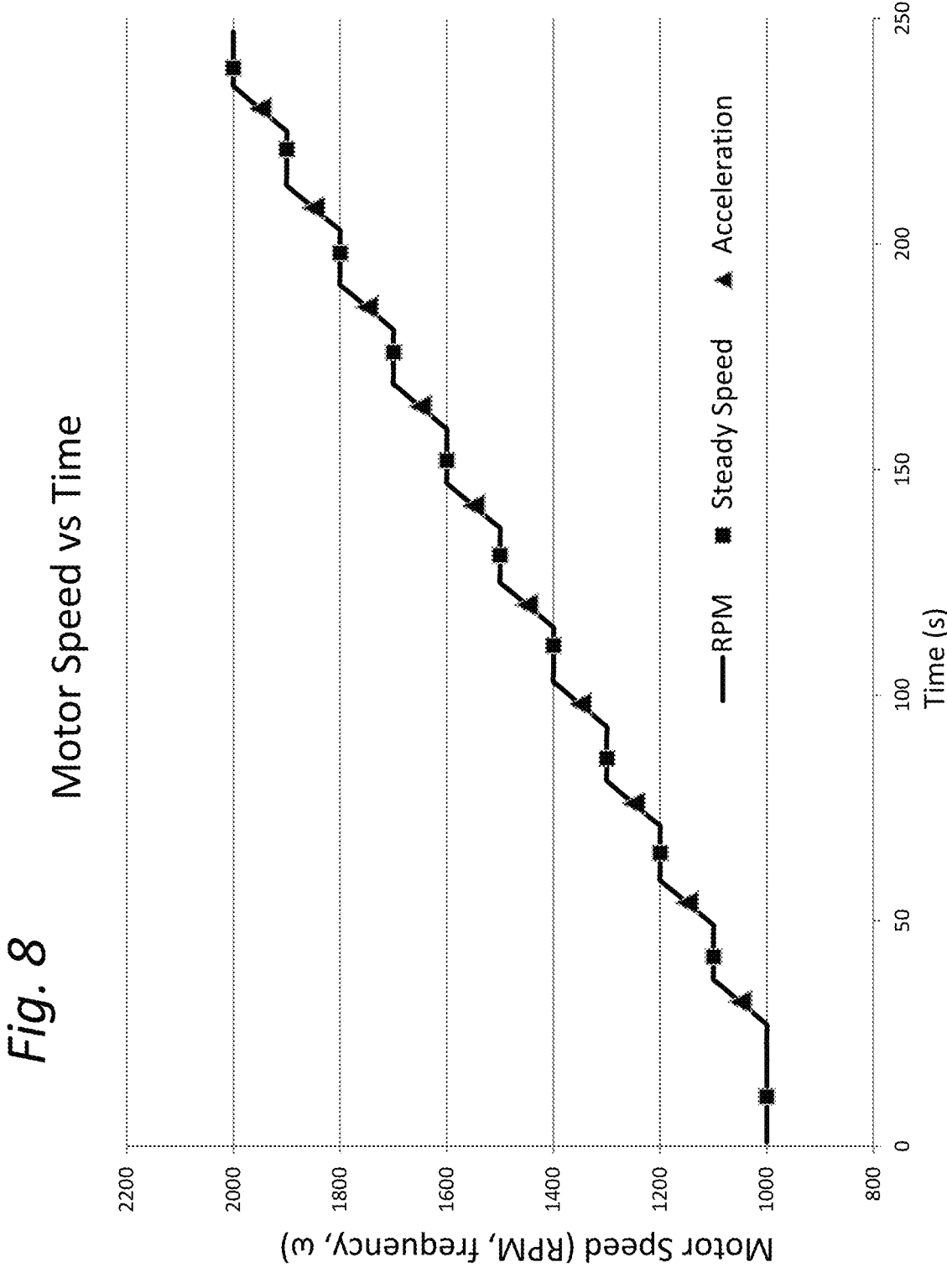
FIG. 8 graphically depicts an example motor speed (frequency, $\omega$) vs time routine.

FIG. 8 graphically depicts an example motor speed vs time routine which is consistent with aspects and embodiments of the present invention. In the example of FIG. 8, a motor is accelerated from 1,000 RPM to 2,000 RPM in approximately 250 seconds, or 4 minutes 10 seconds. The motor is accelerated at 10 RPM/s² (over 10 seconds) and the motor speed is held at steady speed (at each motor speed) for 10 seconds. This provides relevant data for frequency-domain analysis at steady motor speed and also for the system under acceleration (the "third example task" of accelerating a mass). During motor acceleration, additional motor torque (power, current, i) may be required to accelerate the rotating mass of the motor and the machine or pump. In the case of a pump, fluid must be accelerated (requiring additional torque); in the case of an accelerating ground vehicle or generalized machine tasked with accelerating a mass, the acceleration of mass also requires additional torque. Embodiments of the present invention include steady-state (steady/constant motor speed) frequency-domain analysis as well as frequency domain analysis of an accelerating system.

FIG. 8 graphs a continuous line (RPM), with square markers at steady state motor speed and triangle markers during motor and system acceleration. Previously described embodiments of the present invention have included frequency-domain analysis using data collected at a plurality of steady motor speed conditions. The data with square markers of FIG. 8 provides the appropriate frequency-domain data analysis of the present invention as described heretofore. However, the data with triangle markers (collected under system acceleration) provides for similar frequency-domain analysis of an accelerating system. An accelerating system may, by Newton's Second Law (F=ma or T=Iα, where F and T are force and torque, m and l are mass and rotational inertia, and a and α are acceleration and angular acceleration), require additional force/torque over and above the steady-speed counterparts. Furthermore, the triangle marked acceleration data provides data at intermediate shaft speeds; in FIG. 8, the motor is accelerated between 1000 RPM and 1100 RPM; the left-most triangle marker of FIG. 8 provides data (for an accelerating system) at intermediate speeds (e.g., 1,050 RPM, 1,020 RPM, 1,037.5 RPM, etc.). FIG. 8 illustrates that relevant data to implement the present invention may be collected at steady speed or during acceleration. Thus, frequency-domain analysis of an accelerating system is disclosed as another embodiment of the present invention. In general, data collected during steady speed conditions are not co-mingled with data collected during acceleration (because of the additional power required for acceleration). Embodiments of the present invention include independent frequency-domain analysis of steady speed and accelerating data; comparison of the two data sets provides further analysis of the "mechanical efficiency" of an accelerating system.

Embodiments of direct frequency-domain analysis may further comprise at least one of the following steps or features, in any (non-conflicting) combination, among other features disclosed herein:

Determining a differentiable mathematical function (model) of a mechanical system (a machine) rotationally coupled to a motor; this mathematical function may be derived from governing equations (e.g., affinity laws, eq. 1 through eq. 3) or experimentally determined (e.g., measuring drag as a function of Reynolds number).

Incrementally (or continuously) increasing (or decreasing) the machine shaft speed, $\omega$, by a factor of k with each speed increment.

Measuring the input power, i, as a function of machine shaft speed, w; thus generating a first data set of ordered pairs ($\omega$, i).

Numerically differentiating (at least once) the input power, i, with respect to machine shaft speed, $\omega$. Preferred embodiments comprise "marching" from (at or near) one end of a data set to (at or near) the other end of a data set, thus generating second (and subsequent) data sets that are numerical derivatives of a preceding data set.

Calculating a plurality of coefficients (e.g., A, B, C, and D for a polynomial function) of the predetermined mathematical function (model) at each machine shaft speed. The mathematical function is "locally defined" (at a specific or discrete frequency $\omega$) such that the coefficients (calculated at a specific frequency or shaft speed, $\omega$) may be unique and/or valid only at (or near)

that specific frequency. Coefficients for a plurality of other frequencies are calculated similarly; thus the mathematical function is defined over a broad domain (shaft speed or frequency, ω) by concatenating "locally defined" mathematical functions (e.g., polynomial, power, exponential, logarithmic, etc.) throughout the experimental range of interest.

Comparing or evaluating a plurality of the measured/calculated coefficients (e.g., coefficient A(1.1)=A(1.0), B(1.2)=C(1.2), B(1.2)÷B(1.1), etc.) at a plurality of machine shaft speeds, w.

Identifying at least one machine shaft speed, ω, wherein one or more coefficients (or derivatives, integrals or algebraic manipulation thereof) satisfies one or more conditions of a predetermined "best operating point" (BOP) or "threshold condition" wherein conditional statements with coefficients as arguments are evaluated for desired outcome (e.g., TRUE, FALSE, YES, NO, etc.). Alternatively, the BOP or threshold condition may comprise limits (e.g., minimum, maximum, greater than a predetermined value, less than a predetermined value, etc.) that are imposed upon the coefficient(s).

Calculating derived quantities from the experimentally determined coefficients (e.g., efficiency, flow, pressure, work, viscous drag, pressure drag, dynamic friction, etc.); these derived quantities may be displayed through display/interface 560 or stored in memory.

Operating the machine at a machine shaft speed, ω, at which one or more best operating point(s) (BOP) or threshold condition(s) are met.

Because k is the ratio of shaft speeds or experimental frequencies, embodiments of the present invention may increment k as a ratio (e.g., $\omega(i+1)=k\omega(i)$); in other embodiments a fixed or otherwise variable interval may be selected (e.g., $\omega(i+1)=\omega(i)+\Delta\omega$, etc.) where k is a constant ratio of frequencies, Aw is a fixed or variable interval and i is an index loop counter. In cases wherein a constant value of k (the ratio of shaft speeds) is maintained throughout the domain (the range of frequencies or shaft speeds, ω), the constant, k, may be algebraically eliminated or neglected. The approach of incrementing frequency by a fixed quantity (e.g., $\omega(i+1)=\omega(i)+\Delta\omega$, etc.) is selected herein for graphical clarity.

The example calculations presented herein for direct frequency-domain analysis generally apply to an AC induction motor powered by a variable-speed drive, or VFD; and assume that the voltage to the motor remains constant throughout the frequency range. Electric motors have an inherent efficiency, which may vary with frequency. Input power to an AC induction motor may be measured by measuring current, as presented herein. The input power to an electric motor and shaft output power are given in eq. 23, along with a calculated efficiency, η:

$$\text{Input power} = Vi; \text{Shaft output power} = T\omega; \eta = Vi/T\omega \qquad \text{Eq. 23}$$

Where V is voltage (assumed constant), i is current (which is variable and measured), T is the motor shaft torque, and ω is the frequency or motor speed. Taking the first derivative (with respect to ω) of power expressions of eq. 23 yields eq. 24:

$$(\text{Input})d/d\omega(Vi) = Vdi/d\omega = Vi'; (\text{Output})d/d\omega(T\omega) = T \qquad \text{Eq. 24}$$

From eq. 24 it follows that the derivative of input power is a constant (V) multiplied by i'; and that the derivative of output power is the torque (T), assumed to be independent of w. The example calculations presented herein tacitly assume that the voltage remains constant and the derivative of input power is Vdi/dω or a constant (V) multiplied by i'. The constant (V) may be (a) carried throughout the calculations, (b) algebraically incorporated into the coefficients or (c) neglected. For other motor types (e.g., DC motors, brushless DC motors, brushless DC servomotors, etc.) which employ variable voltage with shaft speed or frequency, the effect of variable voltage may need to be included. In some cases, the input power to the motor may be internally calculated by the variable-speed motor controller; in such cases, appropriate derivatives may be calculated upon the input power data (instead of motor current, i). The example calculations presented herein assume a constant motor efficiency throughout the frequency range. More refined results may be obtained by employing techniques including: (1) experimentation to measure motor efficiency (2) utilizing published data or (3) utilizing empirical or governing equation(s) to incorporate correction factors for any identified non-linearity.

The present invention comprises efficient numerical analysis which may be implemented within or retrofitted to existing machinery such as pumping systems with a minimum of components and at minimal cost. A representative embodiment employs a SBC (single board computer) such as Arduino, Raspberry Pi, etc. These platforms provide adequate analog and digital I/O, memory and processing power for implementation, however more elaborate or proprietary hardware may be substituted. Programming may be conducted in programming languages such as C++, Python, etc. or visual programming languages such as LabView, etc.

In order to provide a clear and consistent understanding of the disclosure and the appended claims, including the scope to be given such terms, the following glossary of terms and definitions is provided along with an index of figure annotations.

Frequency Domain Work Calculations-A sequence comprising: defining a mathematical function comprising a first plurality of variable coefficients, numerically differentiating motor power data with respect to frequency, determining the first plurality of coefficients from the numerically differentiated data at a second plurality of frequencies, comparing (e.g., ratiometrically) at least some of the total number of determined coefficients with respect to one another, and determining the ratio of machine work output to heat loss, thereby determining the efficiency of the machine.

Efficiency—herein the ratio of (machine work) to (machine work+heat loss) including on a per unit time basis.

Curvature—(1) descriptive of observable change in slope; may be characterized as: quadratic curvature, cubic curvature, zero curvature, exponential curvature, logarithmic curvature, etc. (2) the mathematical definition of eq. 19.

The following referencing numbers are used in this disclosure:

| 100 | current analysis |
|---|---|
| 110 | algebraic current model |
| 120 | numerical current model |
| 130 | numerical derivatives |
| 140 | polynomial coefficients |
| 150 | pump power |
| 210 | motor current (i) |
| 215 | frequency (ω) |

-continued

| | |
|---|---|
| 220 | 1st derivative (i') |
| 230 | 2nd derivative (i") |
| 240 | 3rd derivative (i''') |
| 250 | 4th derivative (i''''') |
| 255 | coefficient A |
| 260 | coefficient B |
| 265 | coefficient C |
| 270 | coefficient D |
| 275 | coefficient A' |
| 280 | coefficients A, B, C, D and A' at ω = 1.0 |
| 285 | cells with greater error |
| 200 | perfect machine |
| 202 | linear machine |
| 204 | quadratic machine |
| 206 | cubic machine |
| 207 | linear at 700 RPM |
| 209 | linear at 900 RPM |
| 208 | linear at 800 RPM |
| 211 | linear at 1100 RPM |
| 212 | linear at 1200 RPM |
| 217 | linear at 1000 RPM |
| 201 | sum of machines |
| 290 | data for 280 |
| 510 | pump power |
| 520 | motor |
| 530 | variable speed drive |
| 540 | power measurement |
| 550 | controller |
| 560 | display/interface |
| 570 | efficiency display |
| 571 | setpoint/override |
| 577 | speed override |
| 580 | flow display |
| 585 | flow setpoint |
| 587 | flow setpoint/override |
| 590 | pressure display |
| 592 | pressure setpoint |
| 595 | viscosity display |
| 597 | setpoint/override |
| 599 | power - E. Stop |

What is claimed is:

1. A method of operating a machine comprising a motor rotationally coupled to a load, the method comprising:

operating the motor at a plurality of speeds within a range bounded by a lower speed and an upper speed;

measuring, with a current sensor, electrical current supplied to the motor at each of the plurality of speeds;

correlating each current measurement to its corresponding speed to generate correlated speed-current data;

determining, from the correlated speed-current data, a plurality of numerically calculated derivatives of current with respect to speed;

determining, from the plurality of numerically calculated derivatives of current, a plurality of derived values of coefficients A and B that fit the correlated speed-current data to a model, having at least two terms, of the form $A \cdot \omega^{n1} + B \cdot \omega^{n2}$, the model representing a load-dependent relationship between current and speed, where ω is the speed and $n_1$ and $n_2$ are real numbers individually selected from the group consisting of 0, 1, 2, 3, and k, wherein k is a non-integer real number;

identifying a speed at which at least one of the determined coefficients A or B satisfies a predetermined criterion; and operating the motor at a speed determined based on the identified speed.

2. The method of claim 1, wherein the load-dependent relationship is expressed as $A \cdot \omega^{n1} + B \cdot \omega^{n2} + C \cdot \omega^{n3}$, where n1, n2, and n3 are real numbers selected from the group consisting of 0, 1, 2, 3, and k, wherein k is a non-integer real number.

3. The method of claim 1, wherein the load-dependent relationship is expressed as $A \cdot \omega^3 + B \cdot \omega^2 + C \cdot \omega + D$.

4. The method of claim 1, wherein the values of coefficients A and B are determined using back-substitution from one or more numerically calculated derivatives of current with respect to speed.

5. The method of claim 1, wherein the load is a pump.

6. The method of claim 1, wherein the machine/load is selected from the group consisting of: a watercraft/a propeller shaft coupled to a marine propeller, a ground vehicle/a drivetrain shaft coupled to a road wheel, an aircraft/a propeller shaft, and a milling machine/a spindle coupled to a cutting tool.

7. The method of claim 3, comprising:

defining normalized coefficients as:

$$A^* = A / (\omega^3),$$

$$B^* = B / (\omega^2),$$

$$C^* = C / (\omega), \text{ and}$$

$$D^* = D;$$

wherein efficiency is given by n=A*/(A*+B*+C*+D*).

8. The method of claim 7, wherein a maximum efficiency point is indicated by a local maximum of normalized coefficient A* with respect to speed.

9. The method of claim 3, wherein cavitation onset is indicated by a decrease in coefficient A and a corresponding increase in at least one of coefficients B, C, or D.

10. A machine comprising:

a motor rotationally coupled to a load;

a sensor configured to measure input power electrical current supplied to the motor; and a controller in electrical communication with the motor and the sensor, the controller configured to:

(i) operate the motor at a plurality of speeds within a range bounded by a lower speed and an upper speed;

(ii) receive, from the sensor, a current measurement at each of the plurality of speeds;

(iii) correlate each current measurement to its corresponding speed to generate correlated speed-current data;

(iv) determine, from the correlated speed-current data, a plurality of numerically calculated derivatives of current with respect to speed;

(v) determine, from the plurality of numerically calculated derivatives of current, a plurality of derived values of coefficients A and B that fit the correlated speed-current data to a model, having at least two terms, of the form $A \cdot \omega^{n1} + B \cdot \omega^{n2}$, the model representing a load-dependent relationship between current and speed, where ω is the speed and n1 and n2 are real numbers individually selected from the group consisting of 0, 1, 2, 3, and k (k being a non-integer real number);

(vi) identify a speed at which at least one of the determined coefficients A or B satisfies a predetermined criterion; and (vii) operate the motor at a speed determined based on the identified speed.

11. The machine of claim 10, wherein the controller is further configured to determine a coefficient C such that the load-dependent relationship is expressed as $A \cdot \omega^{n1} + B \cdot^{n2} + C \cdot \omega^{n3}$, where n1, n2, and n3 are real numbers individually selected from the group consisting of 0, 1, 2, 3, and k (k being a non-integer real number).

12. The machine of claim 10, wherein the controller is further configured to determine coefficients A, B, C, and D such that the load-dependent relationship is expressed as $A \cdot \omega^3 + B \cdot \omega^2 + C \cdot \omega + D$.

13. The machine of claim 12, wherein the controller is further configured to: define normalized coefficients as:

$$A^* = A / (\omega^3),$$

$$B^* = B / (\omega^2),$$

$$C^* = C / (\omega), \text{ and}$$

$$D^* = D;$$

wherein efficiency is given by $n = A^*/(A^* + B^* + C^* + D^*)$.

14. The machine of claim 13, wherein the controller is further configured to identify a maximum efficiency point by a local maximum of normalized coefficient A\* with respect to speed.

15. The machine of claim 12, wherein the controller is further configured to detect cavitation onset by a decrease in coefficient A and a corresponding increase in at least one of coefficients B, C, or D.

16. The machine of claim 10, wherein the controller is further configured to determine the values of coefficients A and B using back-substitution from one or more numerically calculated derivatives of current with respect to speed.

17. The machine of claim 10, wherein the load is a pump.

18. The machine of claim 10, wherein the machine/load is selected from the group consisting of: a watercraft/a propeller shaft coupled to a marine propeller, a ground vehicle/a drivetrain shaft coupled to a road wheel, an aircraft/a propeller shaft, and a milling machine/a spindle coupled to a cutting tool.

\* \* \* \* \*